US009616784B2

(12) United States Patent
Nagayasu

(10) Patent No.: US 9,616,784 B2
(45) Date of Patent: Apr. 11, 2017

(54) VEHICLE SEAT

(71) Applicant: TOYOTA BOSHOKU KABUSHIKI KAISHA, Aichi-ken (JP)

(72) Inventor: Hidetaka Nagayasu, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 159 days.

(21) Appl. No.: 14/091,729

(22) Filed: Nov. 27, 2013

(65) Prior Publication Data

US 2014/0145476 A1 May 29, 2014

(30) Foreign Application Priority Data

Nov. 29, 2012 (JP) ................................. 2012-261027

(51) Int. Cl.
*A47C 7/50* (2006.01)
*B60N 2/44* (2006.01)
(Continued)

(52) U.S. Cl.
CPC ............. *B60N 2/4495* (2013.01); *B60N 2/22* (2013.01); *B60N 2/62* (2013.01); *B64D 11/06* (2013.01);
(Continued)

(58) Field of Classification Search
CPC ... A47C 1/03238; A47C 7/506; A47C 1/0355; A61G 5/12; B60N 2/4495
(Continued)

(56) References Cited

U.S. PATENT DOCUMENTS 3,858,938 A * 1/1975 Kristensson ........... A61G 5/006
297/423.19
4,937,900 A * 7/1990 Bridges ................ A47C 1/0342
297/330
(Continued)

FOREIGN PATENT DOCUMENTS

JP 3-45748 4/1991
JP 8-24067 1/1996
(Continued)

OTHER PUBLICATIONS

U.S. Appl. No. 14/176,352 to Hidetaka Nagayasu, filed Feb. 10, 2014.
(Continued)

*Primary Examiner* — David R Dunn
*Assistant Examiner* — Alexander Harrison
(74) *Attorney, Agent, or Firm* — Greenblum & Bernstein, P.L.C.

(57) ABSTRACT

A vehicle seat in which an angle of a seatback with respect to a seat cushion is adjustable and which includes an ottoman in front of the seat cushion includes: an association mechanism which operates the seatback and the ottoman in association with each other; and an association prohibition mechanism, wherein when a tilting operation to tilt the seatback forward from a normal usage position is performed so as to decrease a relative angle of the seatback with respect to the seat cushion, the association prohibition mechanism disables an association function of the ottoman caused by the association mechanism according to the tilting operation.

7 Claims, 15 Drawing Sheets

(51) Int. Cl.
  *B60N 2/62* (2006.01)
  *B60N 2/22* (2006.01)
  *B64D 11/06* (2006.01)

(52) U.S. Cl.
  CPC ........ *B64D 11/064* (2014.12); *B64D 11/0643* (2014.12)

(58) Field of Classification Search
  USPC .... 297/85 R, 423.24, 423.26, 423.28, 423.3, 297/343
  See application file for complete search history.

(56) References Cited

U.S. PATENT DOCUMENTS

| | | | | |
|---|---|---|---|---|
| 5,156,441 A * | 10/1992 | Byersmith | ........... | A47C 1/0352 297/423.28 |
| 5,292,170 A * | 3/1994 | LaPointe | ............. | A47C 1/0352 297/68 |
| 5,427,431 A * | 6/1995 | Saul | ..................... | A47C 1/0345 297/342 |
| 5,498,055 A * | 3/1996 | Goldman | ............... | A47C 1/035 297/282 |
| 6,439,636 B1 * | 8/2002 | Kuo | ........................... | 296/65.09 |
| 6,491,342 B1 * | 12/2002 | Smith | ................... | A47C 1/0352 297/68 |
| 6,604,791 B1 * | 8/2003 | Chen | ...................... | A47C 1/035 297/300.1 |
| 6,612,650 B1 * | 9/2003 | Ambrosio | .............. | A47C 1/035 297/330 |
| 6,974,186 B1 * | 12/2005 | Chang | .................... | A47C 1/035 297/423.19 |
| 7,011,362 B1 * | 3/2006 | Huang | ................... | A47C 1/035 297/325 |
| 7,374,245 B2 * | 5/2008 | Tanaka et al. | ................ | 297/343 |
| 7,429,083 B2 * | 9/2008 | Tsuji et al. | ............... | 297/423.26 |
| 7,637,571 B2 * | 12/2009 | Okano et al. | ................. | 297/343 |
| 8,113,573 B2 * | 2/2012 | Lawson | ................ | B64D 11/06 297/118 |
| 8,714,638 B2 * | 5/2014 | Hoffman et al. | .......... | 297/85 L |
| 8,882,190 B2 * | 11/2014 | Garland | ..................... | 297/85 L |
| 8,944,513 B2 * | 2/2015 | Suzuki et al. | ........... | 297/423.26 |
| 2005/0140183 A1 * | 6/2005 | Conte | .................. | A47C 1/0352 297/68 |
| 2008/0315659 A1 * | 12/2008 | Schacht et al. | .......... | 297/423.28 |
| 2009/0243368 A1 * | 10/2009 | LaPointe | ..................... | 297/85 R |
| 2010/0132118 A1 * | 6/2010 | Robertson | ............ | A47C 1/0342 5/617 |
| 2010/0244534 A1 * | 9/2010 | Driessen et al. | .......... | 297/423.35 |
| 2012/0104827 A1 * | 5/2012 | Murphy et al. | ............. | 297/85 M |
| 2012/0112519 A1 * | 5/2012 | Murphy et al. | ............. | 297/85 M |
| 2013/0285433 A1 * | 10/2013 | Yamada et al. | ............ | 297/423.3 |
| 2013/0313867 A1 * | 11/2013 | Kuno | ....................... | B60N 2/62 297/83 |

FOREIGN PATENT DOCUMENTS

| | | |
|---|---|---|
| JP | 2005-300 | 1/2005 |
| JP | 2005-124950 | 5/2005 |

OTHER PUBLICATIONS

Office Action issued in Japan Patent Appl. No. 2012-261027, dated Mar. 15, 2016, along with an English translation thereof.

* cited by examiner

VEHICLE SEAT

INCORPORATION BY REFERENCE

The disclosure of Japanese Patent Application No. 2012-261027 filed on Nov. 29, 2012 including the specification, drawings and abstract is incorporated herein by reference in its entirety.

BACKGROUND OF THE INVENTION

1. Field of the Invention

The invention relates to a seat for a vehicle such as an automobile, a train, and an airplane, and particularly relates to a vehicle seat in which an angle of a seatback with respect to a seat cushion is adjustable and which includes an ottoman in front of the seat cushion.

2. Description of Related Art

There has been developed such a technique in which an ottoman provided in front of a seat cushion of a vehicle seat typified by some automobiles is moved between an unfolded position and a stored position in association with an angle adjustment of a seatback (see Japanese Utility Model Publication No. 345748 (JP3-45748 U)). Such a vehicle seat is configured such that when the seatback is tilted backward from a normal usage position suitable for sitting so as to sit in a comfortable posture, the ottoman moves from the stored position to the unfolded position by a link mechanism. In this case, in the stored position, the ottoman is stored at a predetermined position of a front lower portion of the seat cushion, and in the unfolded position, the ottoman is placed at a predetermined position in front of the seat cushion so as to support legs of a sitting occupant from a bottom side so that the occupant can easily have a comfortable posture. In the meantime, some vehicle seats have a function to perform a large tilting operation to largely tilt a seatback forward from the normal usage position so as to secure movement of people behind the seat or to expand space behind the seat in a passenger compartment.

SUMMARY OF THE INVENTION

When a seat including a seatback-associated ottoman as described above has a largely-tilting function, the following problem may be caused. That is, an ottoman is configured so as to operate in association with an angle modulation of the seatback. In view of this, when the large tilting operation is performed on the seatback, the ottoman tends to move from its stored position to a reverse side to its unfolded position in association with the large tilting operation on the seatback. However, since a structure such as a structural member for supporting the seat on a vehicle floor is provided inside the stored position for the ottoman (on the reverse side to the unfolded position), the ottoman is not able to move inwardly from the stored position. This accordingly makes it difficult to perform the large tilting operation on the seatback. The invention provides a vehicle seat including a seatback-associated ottoman that allows a large tilting operation on a seatback by disabling an association function between the seatback and the ottoman in a case where a forward-tilting operation is performed on the seatback in a state where the ottoman is placed at a stored position.

A vehicle seat according to an aspect of the invention in which an angle of a seatback with respect to a seat cushion is adjustable and which includes an ottoman in front of the seat cushion includes: an association mechanism which operates the seatback and the ottoman in association with each other, wherein when the seatback is placed at a normal usage position suitable for sitting, the association mechanism causes the ottoman to be stored in a stored position in a front lower portion of the seat cushion, and when the seatback is tilted backward from the normal usage position, the association mechanism moves the ottoman from the stored position to an unfolded position in front of the seat cushion so as to support legs of an occupant from a lower side; and an association prohibition mechanism, wherein when a tilting operation to tilt the seatback forward from the normal usage position is performed so as to decrease a relative angle of the seatback with respect to the seat cushion, the association prohibition mechanism disables an association function of the ottoman caused by the association mechanism according to the tilting operation. According to the above aspect, when the seatback is tilted forward from the normal usage position, the association prohibition mechanism disables the association function of the ottoman by the association mechanism according to the tilting operation. Accordingly, even if a large tilting operation of the seatback is performed in a seat including a seatback-associated ottoman, it is possible to avoid such a problem that the ottoman cannot move due to interference of the ottoman with a structure such as a structural member for supporting the seat onto a vehicle floor. This makes it possible to perform the large tilting operation of the seatback.

In the above aspect, the association mechanism may be a link mechanism which connects the seatback to the ottoman, wherein when the seatback is placed at the normal usage position suitable for sitting, the link mechanism causes the ottoman to be placed at the stored position in the front lower portion of the seat cushion, and when the seatback is tilted backward from the normal usage position so as to increase the relative angle of the seatback with respect to the seat cushion, the link mechanism moves the ottoman from the stored position to the unfolded position in front of the seat cushion so as to support the legs of the occupant from the lower side; and the association prohibition mechanism may be an absorption mechanism, wherein when the seatback is tilted forward from the normal usage position so as to decrease the relative angle of the seatback with respect to the seat cushion, the association prohibition mechanism absorbs a movement of the seatback in a force transmission path including the link mechanism from the seatback to the ottoman so as not to transmit the movement of the seatback. According to the above configuration, when the seatback is tilted forward from the normal usage position, the absorption mechanism absorbs the movement of the seatback. Accordingly, even if a large tilting operation of the seatback is performed in a seat including a seatback-associated ottoman, it is possible to avoid such a problem that the ottoman cannot move due to interference of the ottoman with a structure such as a structural member for supporting the seat on a vehicle floor. This makes it possible to perform the large tilting operation of the seatback.

In the above configuration, the seat cushion and the seatback are fixed to a vehicle floor via a base member; the seatback is connected to the base member in an angle adjustable manner; the seat cushion is connected to a forward-backward moving member to be moved forward and backward in association with an angle adjustment of the seatback and is slidably fixed to the base member; the ottoman is pivotally movable between the stored position and the unfolded position by a first rotating shaft provided in a front end portion of the seat cushion, while the ottoman is prevented from pivoting to a reverse side to the unfolded position when the ottoman is placed at the stored position;

the link mechanism includes a first link member connected between a radially outer portion of the first rotating shaft of the ottoman and a second rotating shaft on the base member so as to drive the ottoman, and a second link member extending from the seat cushion toward the first link member and provided so as to be integrated with the seat cushion and slidably connected to the first link member, wherein when the angle adjustment of the seatback is performed and the seat cushion slides over the base member, the second link member drives the first link member; the second rotating shaft is provided on a slide member supported so as to be slidable forward and backward over the base member; and the absorption mechanism may include a connection body which regularly connects the slide member and the base member so as to prevent the slide member from sliding forward and backward over the base member, and a connection releasing member which disconnects the connection via the connection body between the slide member and the base member, when receiving a movement of the seatback to be tilted forward from the normal usage position. According to the above configuration, when the seatback is tilted forward in a state where the seatback is placed at the normal usage position and the ottoman is placed at the stored position, the ottoman tends to pivot via the respective link members. However, since the ottoman does not pivot from the stored position to the reverse side to the unfolded position, the second rotating shaft receives a force to be transmitted to the first link member from the second link member and is moved by the absorption mechanism. Accordingly, the ottoman and the seat cushion move in parallel together with the first rotating shaft and the second rotating shaft. At this time, in the absorption mechanism, the slide member is disconnected from the base member, so that the slide member slides backward over the base member. Accordingly, a moving amount of a rotation outer-circumferential side portion of the ottoman is reduced in comparison with a case where the ottoman pivots, thereby making it possible to avoid such a problem that the ottoman is interfered with a structure such as a structural member for supporting the seat onto the vehicle floor. This accordingly makes it possible to perform the large tilting operation of the seatback in a seat including a seatback-associated ottoman. Further, since the ottoman is moved in parallel from the stored position, a relative angle to the base member does not change, so that the ottoman is not inclined with respect to the base member at the stored position, thereby making it possible to restrain poor appearance.

In the above configuration, the seat cushion and the seatback are fixed to a vehicle floor via a base member; the seatback is connected to the base member in an angle adjustable manner; the seat cushion is connected to a forward-backward moving member to be moved forward and backward in association with an angle adjustment of the seatback and is slidably fixed to the base member; the ottoman is pivotally movable between the stored position and the unfolded position by a first rotating shaft provided in a front end portion of the seat cushion, while the ottoman is prevented from pivoting to a reverse side to the unfolded position when the ottoman is placed at the stored position; the link mechanism includes a first link member connected between a radially outer portion of the first rotating shaft of the ottoman and a second rotating shaft on the base member so as to drive the ottoman, and a second link member extending from the seat cushion toward the first link member and provided so as to be integrated with the seat cushion and slidably connected to the first link member, wherein when the angle adjustment of the seatback is performed and the seat cushion slides over the base member, the second link member drives the first link member; and the absorption mechanism may be configured such that the absorption mechanism does not move the second rotating shaft by a force that the second rotating shaft receives when the ottoman is pivoted by the second link member via the first link member from the unfolded position to a stored-position side, and the absorption mechanism allows the second rotating shaft to move in a moving direction of the second link member when the second rotating shaft receives a force larger than the above force. According to the above configuration, when the seatback is tilted forward in a state where the seatback is placed at the normal usage position and the ottoman is placed at the stored position, the ottoman tends to pivot via the respective link members. However, since the ottoman does not pivot from the stored position to the reverse side to the unfolded position, the second rotating shaft receives a force to be transmitted to the first link member from the second link member and is moved by the absorption mechanism. Accordingly, the ottoman and the seat cushion move in parallel together with the first rotating shaft and the second rotating shaft. At this time, the force that the second rotating shaft receives from the second link member via the first link member is larger than the force that the second rotating shaft receives when the ottoman is pivoted from the unfolded position to the stored position. As a result, the second rotating shaft is moved to the moving direction of the second link member. Accordingly, a moving amount of a rotation outer-circumferential side portion of the ottoman is reduced in comparison with a case where the ottoman pivots, thereby making it possible to avoid such a problem that the ottoman is interfered with a structure such as a structural member for supporting the seat on the vehicle floor. This accordingly makes it possible to perform the large tilting operation of the seatback in a seat including a seatback-associated ottoman. Further, since the ottoman moves in parallel from the stored position, a relative angle to the base member does not change, so that the ottoman is not inclined with respect to the base member at the stored position, thereby making it possible to restrain poor appearance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
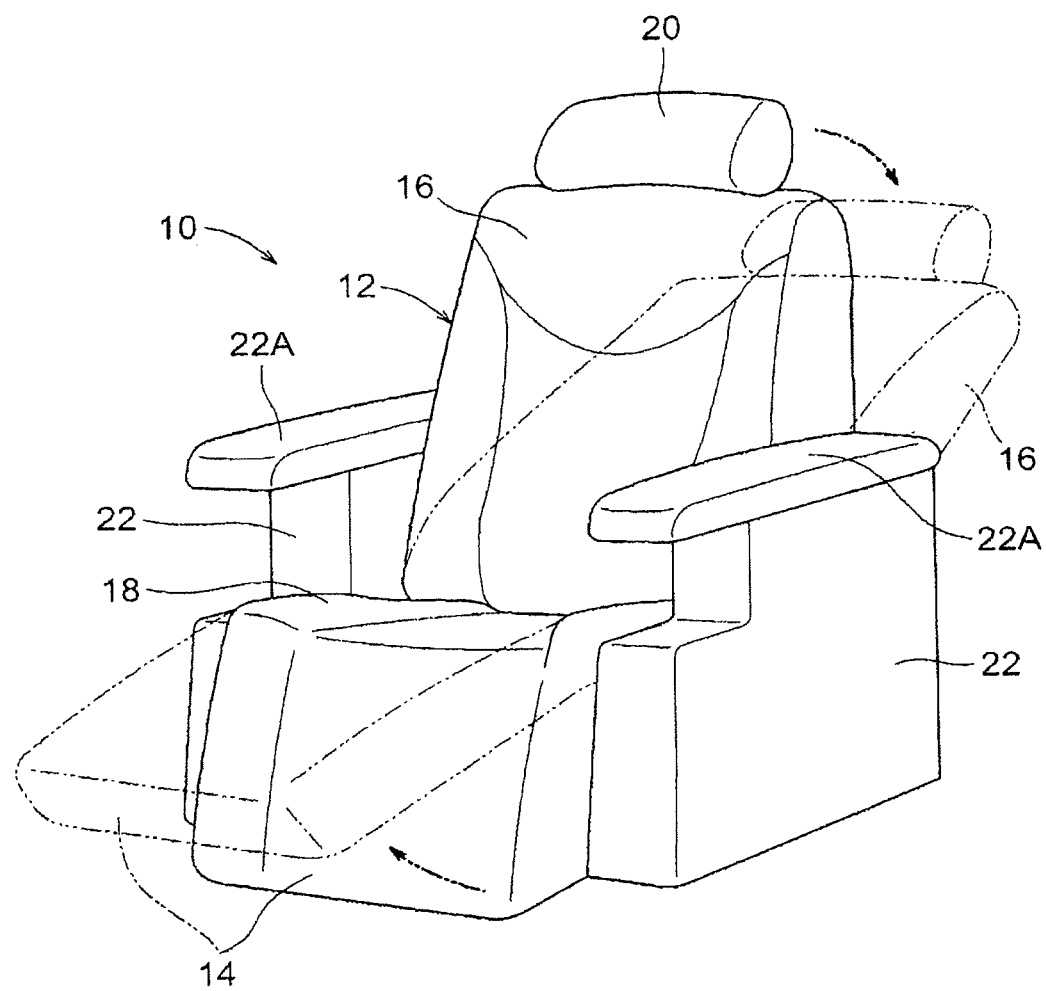
FIG. 1 is a perspective view illustrating an appearance of a vehicle seat according to a first embodiment of the invention.

FIGS. 1 to 10 illustrate a configuration of a vehicle seat 10 according to a first embodiment. As illustrated in 1, the vehicle seat 10 has a configuration of, what is called, a single captain seat disposed in the second row in a vehicle including three rows of sheets, and includes a seatback 16 serving as a backrest for a sitting occupant, and a seat cushion 18 serving as a seat portion. In a front portion of the seat cushion 18, an ottoman 14 that the sitting occupant is able to use as a foot rest is provided. In the present specification, unless especially noted, a front-rear direction is such that a "front" indicates a front-face direction that an occupant sitting on the seat cushion 18 with the seatback 16 as a backrest faces and a "rear" indicates its opposite direction. Further, a right and left direction of the occupant is regarded as a right and left direction, and an up-and-down direction of the occupant is similarly regarded as an up-and-down direction. In FIG. 1, a position change state is illustrated by a continuous line and a virtual line. A continuous-line position state indicates a normal usage position state that is a normal sitting state, and a virtual-line position state indicates a comfortable-posture position state.

At the time when the seatback 16 illustrated in the continuous line is in the normal usage position state in which the seatback 16 is set upright so as to be used as a backrest, the ottoman 14 is in a stored-position state in which the ottoman 14 is folded in a front lower portion of the seat cushion 18. When the seatback 16 is tilted from the normal usage position to a backward tilting position at which the occupant has a comfortable posture as illustrated in the virtual line, the ottoman 14 is changed to an unfolded-position state where the ottoman 14 is raised upward in association with that operation of the seatback 16, so that the ottoman 14 is usable as a foot rest. In the first embodiment, in a position state illustrated in the virtual line, it is possible to adjust, to a given position, a position of the ottoman 14 only in an unfolded state. In any unfolded-position state of the ottoman 14 thus adjusted, it is possible to perform a returning operation to put the ottoman 14 back into the stored-position state in association with an operation to raise the seatback 16 from the backward tilting position to its normal upright position. When the ottoman 14 is set to the unfolded-position state again due to an associated operation with the seatback 16 from a state where the ottoman 14 is put back to the stored position, the ottoman 14 is set to the same unfolded position as a previous unfolded position where the ottoman 14 had been set before the ottoman 14 was put back to the stored position. That is, a so-called memory function works.

As described above, in the vehicle seat 10 according to the first embodiment, it is possible to perform a storing-unfolding operation on the ottoman 14 in association with an operation of the seatback 16, and it is also possible to adjust, to a given position, a position state of the ottoman 14 thus set in the unfolded state in association with the operation of the seatback 16. Further, it is possible to perform the returning operation to put the ottoman 14 back into the stored-position state in association with the seatback 16 while keeping the position state thus adjusted. Moreover, since the so-called memory function works, when the ottoman is moved to an unfolded position again in an associated manner, the ottoman is set to the same unfolded position as a previous position where the ottoman had been placed before the returning operation was performed. Thus, it is possible to improve convenience of the ottoman 14.

The following more specifically describes a configuration of each portion of the vehicle seat 10. As illustrated in FIG. 1, the vehicle seat 10 includes a seat main body 12 including the seatback 16 and the seat cushion 18 as previously described, and the ottoman 14 is disposed in the front lower portion of the seat cushion 18. The ottoman 14 is pivotally supported so as to be pivotally movable relative to the seat cushion 18 so that the ottoman 14 is able to take the stored position illustrated in the continuous line or the unfolded position illustrated in the virtual line. On an upper portion of the seatback 16, a headrest 20 for supporting a head of a sitting occupant is disposed such that the headrest 20 is movable upward and downward in the up-and-down direction. Side walls 22 provided upright from a floor are disposed on right and left side portions of the seat main body 12, and the seat main body 12 is connected to base frames 24A of cushion frames 24 (described later) provided in the side walls 22 so that the seat main body 12 is supported by the base frames 24A. The base frames 24A are an example of a base member in the invention. Note that the vehicle seat 10 provided on the floor of the vehicle is provided on the floor via a slide device (not illustrated herein), so that the vehicle seat 10 is movable slidably in the front-rear direction. As the slide device, it is possible to use a well-known slide device as described in Japanese Patent Application Publication No. 2010-221935 (JP2010-221935 A) or the like. Note that each of the side walls 22 on respective sides is configured such that its top face is set as an arm rest 22A that a sitting occupant is able to use as an arm rest.

A backward tilting operation from a continuous-line position of the seatback 16 illustrated in FIG. 1 to a virtual-line position thereof relative to the seat cushion 18 is performed by a reclining device (not shown) provided in a connection portion between the seat cushion 18 and the seatback 16. Note that as a basic structure of the reclining device, one described in Japanese Patent Application Publication No. 2011-116303 (JP2011-116303 A) or the like is usable, and a specific description thereof is omitted. A spring force to pivot the seatback 16 in a forward direction is continuously given to the reclining device, and the pivoting in the forward direction is locked by a locking mechanism, so that a set position of the seatback 16 is maintained. The locking mechanism of the reclining device is released by a pulling operation of a release lever (not shown) provided on a side portion of the side wall 22 or the like. A spring force is also continuously given to the release lever in a direction to maintain the locking mechanism in a locked state. In view of this, when the pulling operation of the release lever is canceled, the locking mechanism is locked so as to maintain a position state where the seatback 16 is set.

Figure 2:
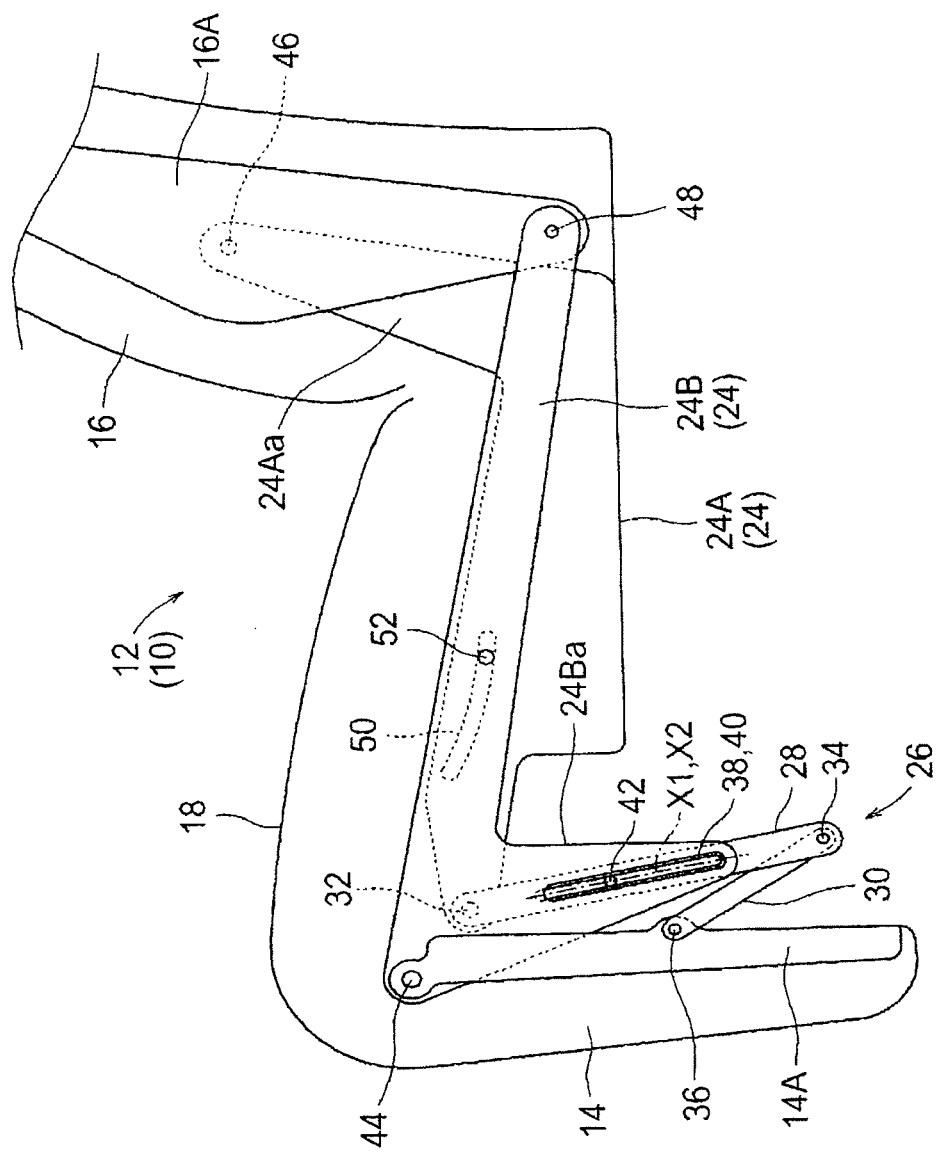
FIG. 2 is a schematic view of an association mechanism for a seatback and an ottoman according to the first embodiment, and is a side view of a case where the ottoman is in a stored-position state.
Figure 3:
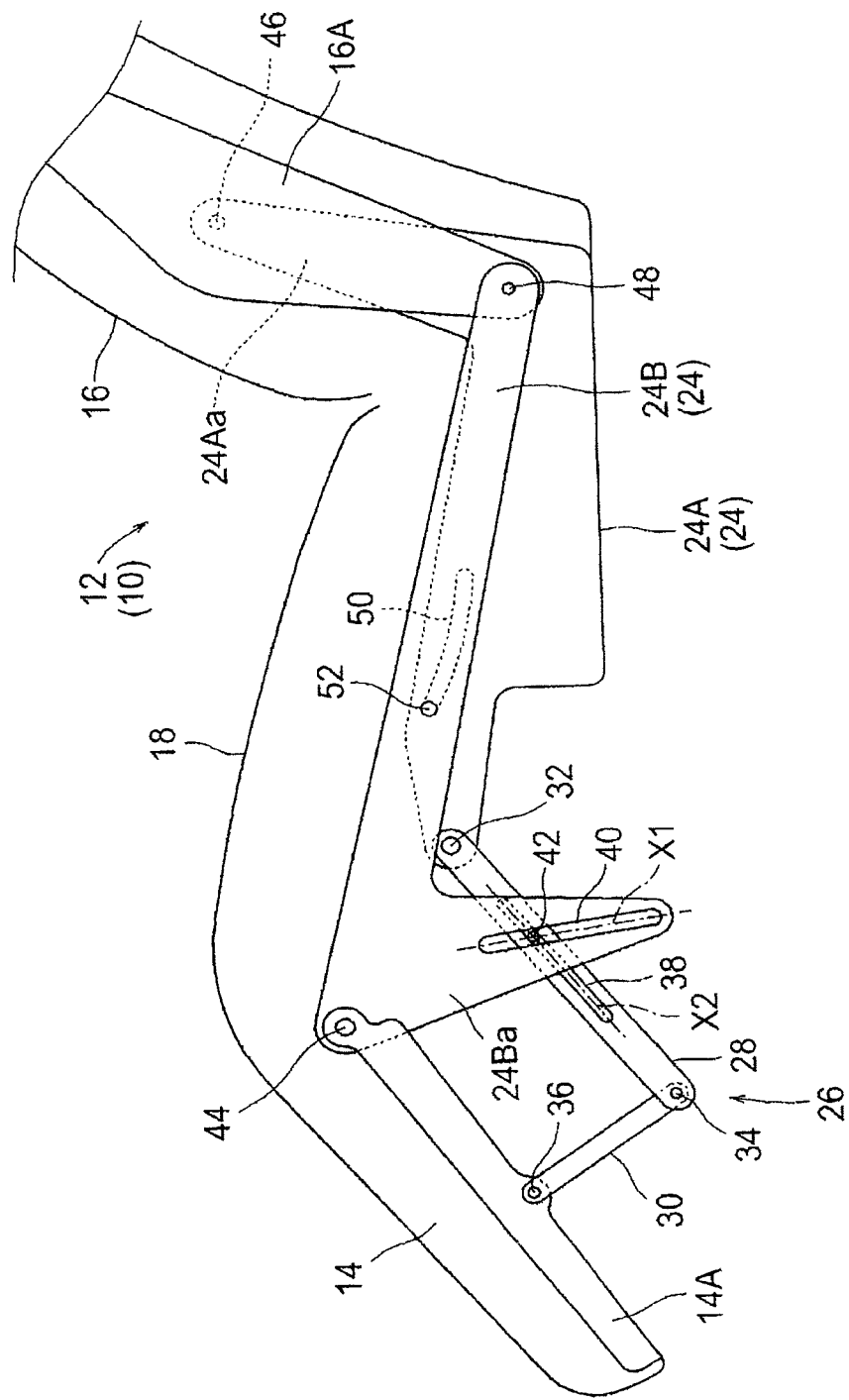
FIG. 3 is a schematic view similar to FIG. 2 and is a side view of a case where the ottoman is in an unfolded-position state.
Figure 4:
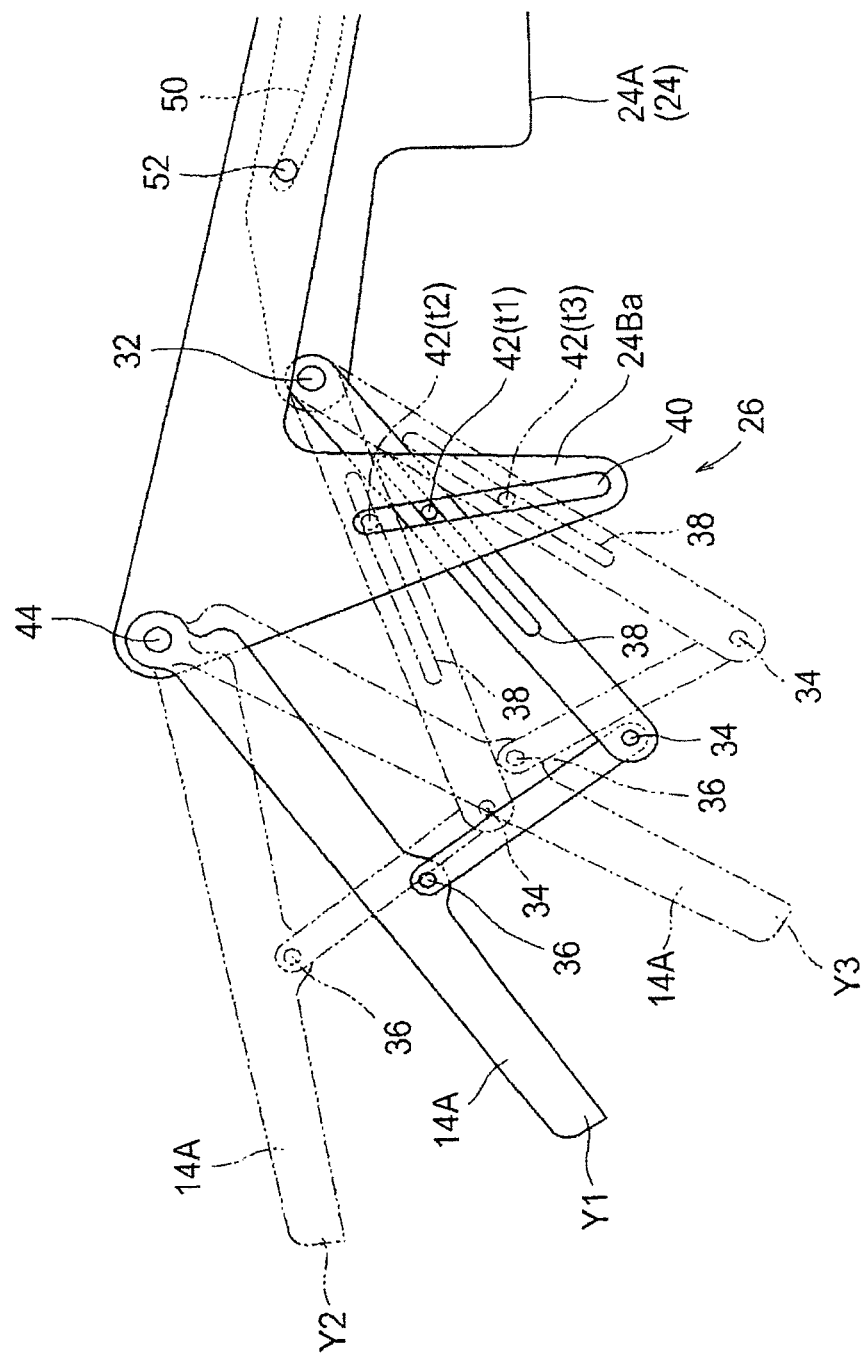
FIG. 4 illustrates a front end portion in the schematic view of FIG. 2, and is an explanatory view illustrating a change in an operation in a case where an unfolded position of the ottoman is adjusted by a link connection configuration.
Figure 5:
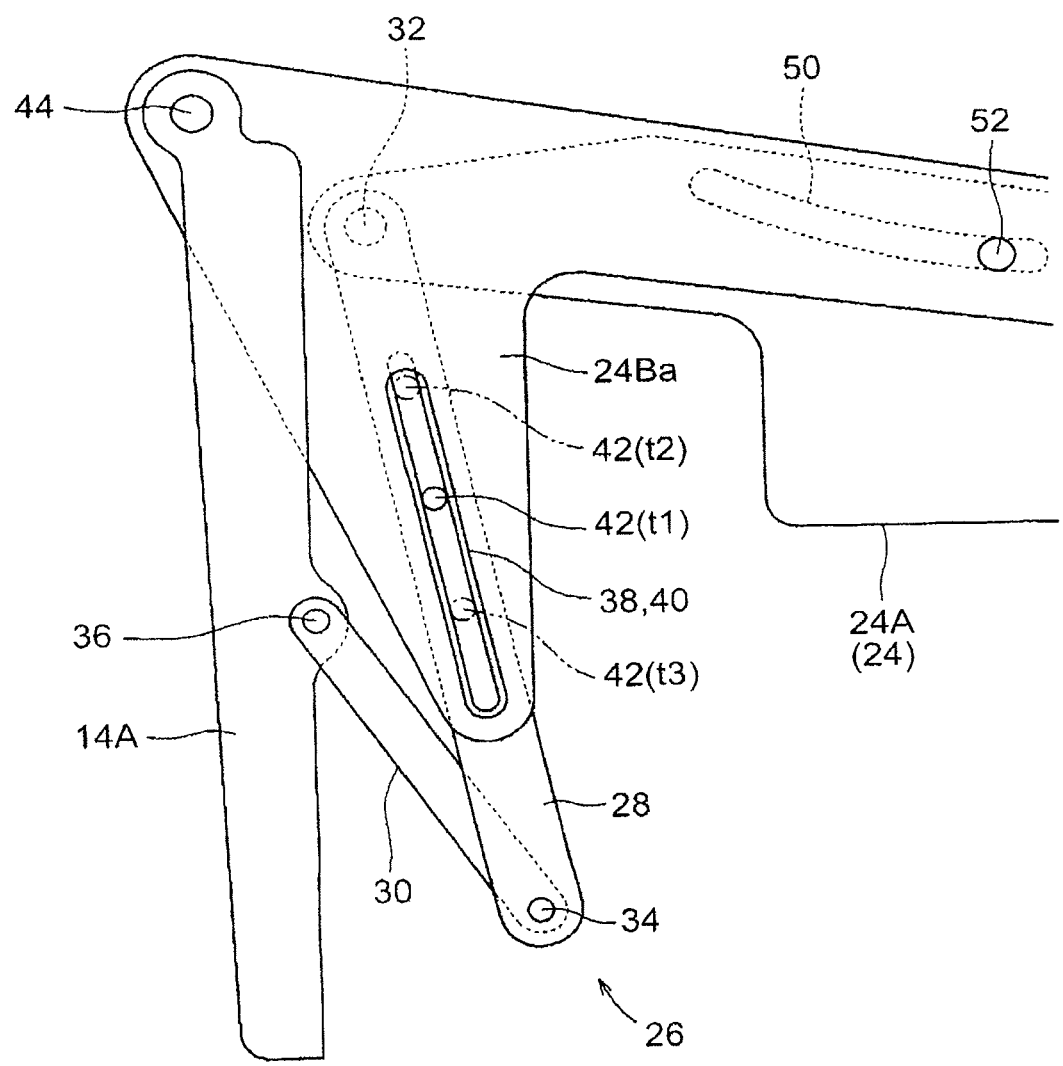
FIG. 5 illustrates the front end portion in the schematic view of FIG. 2 similarly to FIG. 4, and is an explanatory view of an operating state in the case where the ottoman is in the stored-position state.
Figure 6:
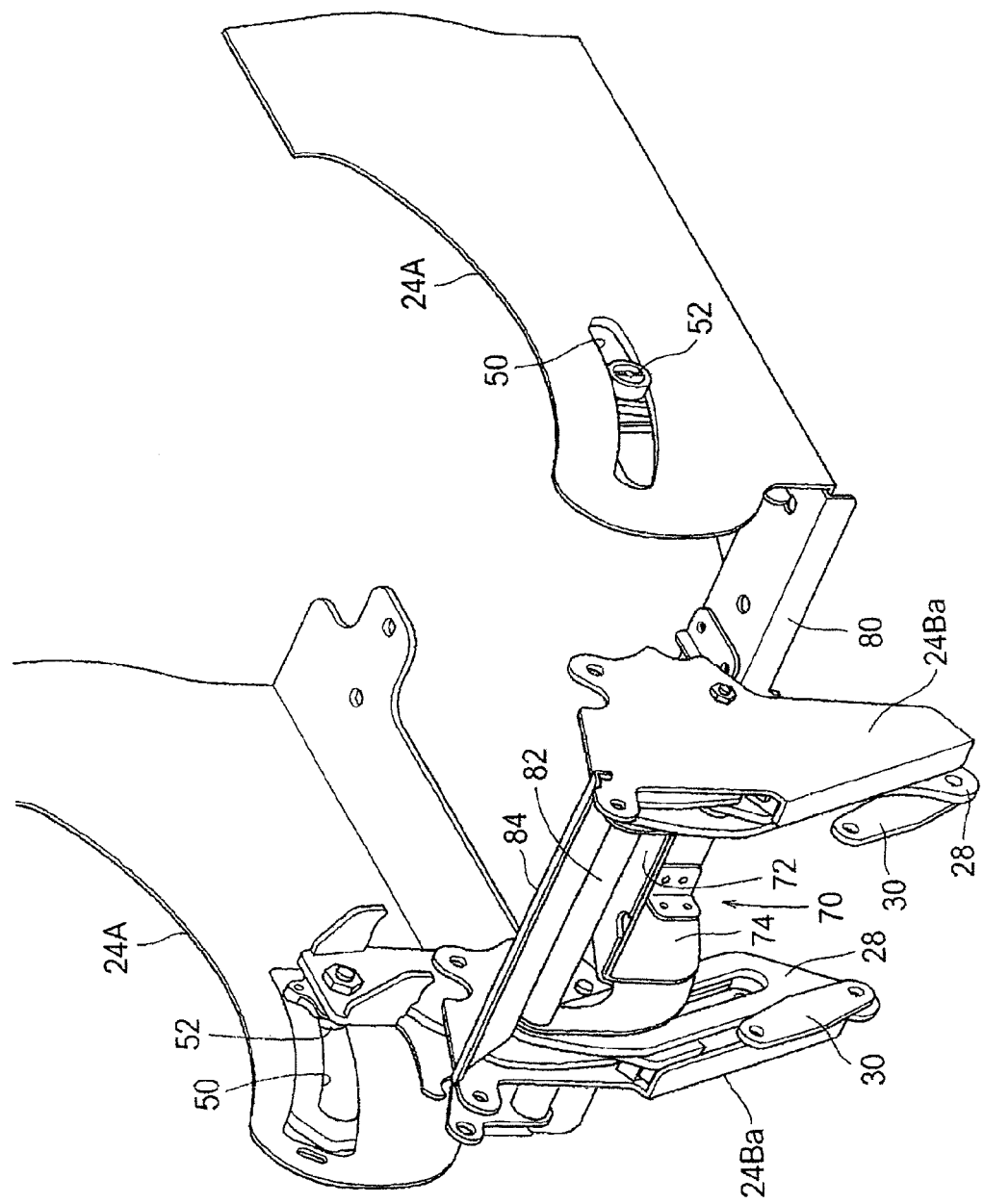
FIG. 6 is a perspective view partially illustrating the ottoman in the association mechanism for the seatback and the ottoman according to the first embodiment.

Next will be described an associated-operation configuration of the seatback 16 and the ottoman 14, based on FIGS. 2 to 5. These figures schematically illustrate a configuration of a side view of the vehicle seat 10. FIGS. 2 and 5 illustrate an association position relationship in which the seatback 16 is in a normal upright position state and the ottoman 14 is in the stored-position state. FIG. 3 illustrates an association position relationship in which the seatback 16 is tilted backward so as to be in the comfortable-posture position state and the ottoman 14 is in the unfolded-position state. FIG. 4 illustrates an operating state in a case where only the unfolded-position state of the ottoman 14 is adjusted in a predetermined association position state in FIG. 3. Initially, the following describes the associated-operation configuration based on FIG. 2. The cushion frame 24 disposed in the seat cushion 18 is constituted by the base frame 24A and a slide frame 24B. The base frame 24A and the slide frame 24B are disposed in a sitting direction so as to be arranged in parallel with each other. The slide frame 24B is disposed so as to be movable relative to the base frame 24A in the front-rear direction, in FIG. 2. In view of this, a guide slot 50 having a shape of an elongated hole in the front-rear direction is formed in the base frame 24A, and a slide pin 52 is integrally provided in the slide frame 24B. The slide pin 52 engages with the guide slot 50 and slides so as to guide the slide frame 24B while regulating a forward and backward movement of the slide frame 24B. The slide frame 24B is an example of a forward-backward moving member in the invention. A rear end portion (a right end portion in FIG. 2) of the slide frame 24B is rotatably connected, by a pin connection 48, to a lower end portion of a side frame 16A of the seatback 16. The side frame 16A of the seatback 16 is connected, by a pivotal support connection 46, to a projecting portion 24Aa, which is a rear portion of the base frame 24A and is provided so as to extend upward, and the seatback 16 is tilted in the front-rear direction around the pivotal support connection 46. Accordingly, when that upper portion of the seatback 16 which is above the pivotal support connection 46 is tilted backward so as to be in a comfortable posture state, this movement is transmitted to the slide frame 2413 via the pin connection 48 as a forward slide movement. On the other hand, a movement of the seatback 16 to be tilted forward from the backward tilting position, which is the comfortable posture state, is transmitted to the slide frame 24B as a backward slide movement. That reclining device (not shown) equipped with a locking mechanism which is able to fix a tilt position of the seatback 16 by the locking mechanism is provided in a part where the side frame 16A of the seatback 16 is rotatably and pivotally supported by the projecting portion 24Aa of the base frame 24A of the seat cushion 18. A front end Portion (a left end portion in FIG. 2) of the slide frame 24B is connected, by a pivotal support connection 44, to one end of a support frame member 14A of the ottoman 14, and the ottoman 14 is disposed at a position of the front lower portion of the seat cushion 18 in a state where the ottoman 14 is pivotally movable around the pivotal support connection 44. Accordingly, the ottoman 14 also moves forward and backward along with the forward and backward movement of the slide frame 24B. Note that a position state where the ottoman 14 hangs downward as illustrated in FIG. 2 is the stored-position state, and the ottoman 14 is stored in the front lower portion of the seat cushion 18. The unfolded state thereof is a state as illustrated in FIG. 3, which is a position state where the other end portion of the ottoman 14 pivots upward. The base frame 24A is provided so as to be slidably movable relative to the floor via a slide device (not shown). Because of this, the whole vehicle seat is provided so as to be movable forward and backward relative to the floor in the present embodiment. Note that a pad member constituting a seat portion of the seat cushion 18 is placed on the slide frame 24B. Hereby, a sitting surface on a top face of the seat cushion 18 is provided integrally with the slide frame 24B, and moves forward and backward along with the forward and backward movement of the slide frame 24B. Accordingly, along with a backward tilting of the seatback 16, the slide frame 24B moves in the forward direction, and the sitting surface of the seat cushion 18 also moves in the forward direction.

A front end portion (a left end portion in FIG. 2) of the base frame 24A and the ottoman 14 is connected by a first link member 26. The first link member 26 is configured such that two elongated tabular link member A 28 and link member B 30 are connected by a pin connection 34. One end of the link member A 28 is relatively pivotally connected, by a pin connection 32, to the front end portion of the base frame 24A, and similarly, the other end thereof is relatively pivotally connected, by the pin connection 34, to one end of the link member B 30. The other end of the link member B 30 is relatively pivotally connected, by a pin connection 36, to a substantially central position (see FIG. 2) of the support frame member 14A of the ottoman 14. The pin connection 32 is an example of a second rotating shaft in the invention. In the front end portion of the slide frame 24B, a slide portion 24Ba is formed integrally therewith so as to extend downward. The link member A 28 of the first link member 26 is disposed in a position state where surfaces of the link member A 28 and the slide portion 24Ba are overlapped with each other. The slide portion 24Ba and the link member A 28 disposed in such an overlapped position state include respective guide slots 38, 40 having a shape of an elongated hole and formed in a linear shape. The respective guide slots 38, 40 are disposed in such a relationship that when the ottoman 14 is placed in the stored-position state as illustrated in FIG. 2, respective members are provided and connected to each other so that respective axes X1, X2 of the respective guide slots 38, 40 coincide with each other. Note that an axis of the guide slot 40 formed in the slide portion 24Ba is X1, and an axis of the guide slot 38 formed in the first link member 26 is X2. The slide portion 24Ba is an example of a second link member in the invention. A common connecting pin member 42 is passed through the respective guide slots 38, 40 so as to engage therewith. The connecting pin member 42 is slidably movable relative to the respective guide slots 38, 40, and is able to change an unfolded angle of the ottoman 14 by changing a relative positional relationship of the connecting pin member 42 with respect to the guide slots 38, 40. Note that, between the connecting pin member 42 and the slide portion 24Ba, a locking mechanism (not shown) for fixing an engaged position state of the connecting pin member 42 with respect to the guide slot 40 is provided.

Next will be described an associated operation in the aforementioned associated-operation configuration of the seatback 16 and the ottoman 14, based on FIGS. 2 to 5. The state in FIG. 2 illustrates a case where the vehicle seat 10 illustrated in FIG. 1 is in the normal usage position state for a normal sitting posture illustrated in the continuous line. In this state, the seatback 16 is set upright and the ottoman 14 is the stored-position state where the ottoman 14 is stored in the front lower portion of the seat cushion 18. In this state, the side frame 16A of the seatback 16 is set upright in a state where the side frame 16A is connected, by the pivotal support connection 46, to the projecting portion 24Aa of the base frame 24A, and the slide frame 24B connected, by the pin connection 48, to the lower end portion of the side frame 16A is placed at a relatively backward position with respect to the base frame 24A. In this position state of the frames 24A, 24B, an engagement relationship between the slide pin 52 provided in the slide frame 24B and the guide slot 50 provided in the base frame 24A is in a state where the slide pin 52 engages with a rear portion of the guide slot 50, in FIG. 2. Such an operation position state of the slide frame 24B is transmitted to the ottoman 14 connected to the front end portion of the slide frame 24B by the pivotal support connection 44. A position control on the ottoman 14 is performed according to a control by the first link member 26 provided between the ottoman 14 and the front end portion of the base frame 24A. The link member A 28 of the first link member 26 is connected, by the pin connection 32, to the front end portion of the base frame 24A in a pivotally movable manner. The pivoting thereof is performed along with a movement of the slide portion 24Ba in the front-rear direction. This is because the connecting pin member 42 fixed to the slide portion 24Ba of the slide frame 24B by the locking mechanism (not shown) engages with the guide slot 38 provided in the link member A 28, in a slidable manner in a direction along the axis X2. In the state illustrated in FIG. 2, the slide portion 24Ba, i.e., the slide frame 24B is placed at a most backward position, so that a lower end of the other end of the link member A 28 is also placed at a most backward position. This position state is transmitted, via the link member B 30 connected to the link member A 28 by the pin connection 34, to that support frame member 14A of the ottoman 14 which is connected to the link member B 30 by the pin connection 36, thereby maintaining the ottoman 14 in the stored position state.

The following describes a moving operation in which the seatback 16 is tilted backward as illustrated in the virtual line from the upright position state of the seatback 16 as illustrated in the continuous line in FIG. 1, thereby causing the ottoman 14 to be in the comfortable posture state where the ottoman 14 is unfolded upward. FIG. 3 illustrates an operating state of the comfortable posture state. Along with a backward tilting of the seatback 16, the side frame 16A of the seatback 16 pivots clockwise around the pivotal support connection 46 as a pivot axis, so that the slide frame 24B connected to the lower end portion thereof by the pin connection 48 is caused to slide forward. That is, the slide frame 24B slides forward relative to the base frame 24A. In this position state of the frames 24A, 24B, an engagement relationship between the slide pin 52 provided in the slide frame 24B and the guide slot 50 provided in the base frame 24A is in a state where the slide pin 52 engages with a front end of the guide slot 50, in FIG. 3. Along with the forward movement of the slide frame 24B as illustrated in FIG. 3, the slide portion 24Ba formed integrally therewith also moves forward. Along with this, the connecting pin member 42 fixed to the slide portion 24Ba pivots the link member A 28 clockwise around, as a pivot axis, a portion connected to the front end portion of the base frame 24A by the pin connection 32 (in FIG. 3), so as to move forward the lower end of the other end of the link member A 28. The movement of the lower end of the link member A 28 is transmitted to the support frame member 14A of the ottoman 14 via the link member B 30 connected by the pin connections 34, 36, so as to pivot the ottoman 14 clockwise around, as a pivot axis, a portion connected to the slide frame 24B by the pivotal support connection 44, so that the ottoman 14 is unfolded upward. At this time, that portion of the ottoman 14 which is connected by the pivotal support connection 44 also moves forward, and thus, an unfolding operation of the ottoman 14 is performed while the ottoman 14 itself is moving forward. The pivoting of the link member A 28 around the pin connection 32 as a pivot axis at the time when the ottoman 14 pivots to be unfolded is performed such that, along with the forward movement of the connecting pin member 42, the connecting pin member 42 slides inside the guide slot 38 of the link member A 28 in a direction toward the lower end of the link member A 28. As such, in the present embodiment, the associated operation of the seatback 16 and the ottoman 14 is performed, so that the normal posture state as illustrated in FIG. 2 is changed to the comfortable posture state as illustrated in FIG. 3. Note that the comfortable posture state as illustrated in FIG. 3 is changed to the normal posture state as illustrated in FIG. 2 by performing an operation reverse to the aforementioned operation.

In the first embodiment, in the comfortable posture state in which the ottoman 14 pivots to be unfolded due to the associated operation along with the backward tilting of the seatback 16 as illustrated in FIG. 3, it is possible to adjust only an unfolded angle state of the ottoman 14 to a given angle in conformity to a preference of the sitting person, without changing a posture state of the seatback 16. That is, while the seatback and the ottoman are operated in association with each other, a relative positional relationship between the seatback and the ottoman in the associated operation is adjustable. This operation is described below with reference to FIG. 4. That unfolded angle position of the ottoman 14 which is illustrated in a continuous line in FIG. 4 is assumed a position Y1 at which the ottoman 14 is unfolded in advance due to the associated operation with the seatback 16. Adjustment of the position Y1 by pivoting the ottoman 14 so as to be changed to positions Y2, Y3 illustrated in a broken line is performable in such a manner that the connecting pin member 42 fixed to the slide portion 24Ba by the locking mechanism (not shown) is released so that the connecting pin member 42 slides inside the guide slot 40 formed in the slide portion 24Ba. When the ottoman 14 is adjusted to the rotating position Y2, the connecting pin member 42 is released from the fixation to the slide portion 24Ba so as to slide from a position t1 to a position t2, and the connecting pin member 42 is fixed again to the slide portion 24Ba. Further, when the ottoman 14 is adjusted to the rotating position Y3, a fixation position of the connecting pin member 42 with respect to the slide portion 24Ba is similarly moved from the position t1 to a position t3 in the guide slot 40. At this time, along with the change of the rotating position of the ottoman 14, the engaged position state of the connecting pin member 42 with respect to the guide slot 38 of the link member A 28 is also changed by sliding.

Next will be described a configuration to tilt the seatback 16 forward from the normal usage position. In the first embodiment, the seatback 16 cannot be tilted forward from the normal usage position. A reason thereof is as follows: the slide portion 24Ba moves backward together with the slide frame 24B according to the forward tilting of the seatback 16, and the link member A 28 pivots counterclockwise around the pin connection 32. This causes the ottoman 14 to pivot via the link member B 30. However, at this time, a rear face of the support frame member 14A integrated with the ottoman 14 is interfered with the link member A 28 around the pin connection 32, so that the pivoting of the ottoman 14 is prevented. When the pivoting of the ottoman 14 is prevented as such, it is difficult for the seatback 16 to be tilted forward from the normal usage position. In the schematic views of FIGS. 2 to 5, such an interference between the rear surface of the support frame member 14A and the link member A 28 does not seem to happen. However, sizes of the support frame member 14A and the link member A 28 are designed so that the interference daringly happens so as to prevent the pivoting of the ottoman 14 as described above.

As illustrated in FIGS. 6 to 9, between right and left paired link members A 28, a slide member 72, a slide base 74, etc., which are an example of an absorption mechanism of the invention, are provided. The following describes an absorption mechanism 70 constituted by the slide member 72, the slide base 74, etc., based on FIGS. 6 to 9. The slide member 72 and the slide base 74 are each configured such that a body portion thereof is formed by a pressed product molded into a gate-like shape, and the slide member 72 and the slide base 74 are provided on top of one another so that the slide member 72 is provided on the slide base 74. The slide member 72 is provided with arm portions 72C respectively extending forward from respective sides of the slide member 72, and the arm portions 72C on the respective sides are provided between the paired link members A 28 with a hollow rod 82 being sandwiched therebetween. Further, paired bracket portions 74C are formed on a rear side of the slide base 74 so as to correspond to the arm portions 72C, and the bracket portions 74C are connected, by a bolt connection (not shown), to a fixing member 80 integrally fixed to the base frames 24A of the seat cushion 18. In a central part of the body portion of the slide base 74, paired guide slots 74B formed in an elongated shape in the front-rear direction are provided side by side in the right and left direction. In the meantime, in a central part of the body portion of the slide member 72, paired through holes 72D are formed so as to correspond to the guide slots 74B. Respective stepped bolts 72A are provided so as to penetrate through the paired through holes 72D, and the stepped bolts 72A connect the slide member 72 to a connecting member 76 with the slide base 74 being sandwiched therebetween. At this time, the stepped bolts 72A penetrate through the guide slots 74B of the slide base 74, and the slide member 72 is freely slidable in the front-rear direction along the guide slots 74B while being regulated by the stepped bolts 72A.

Figure 7:
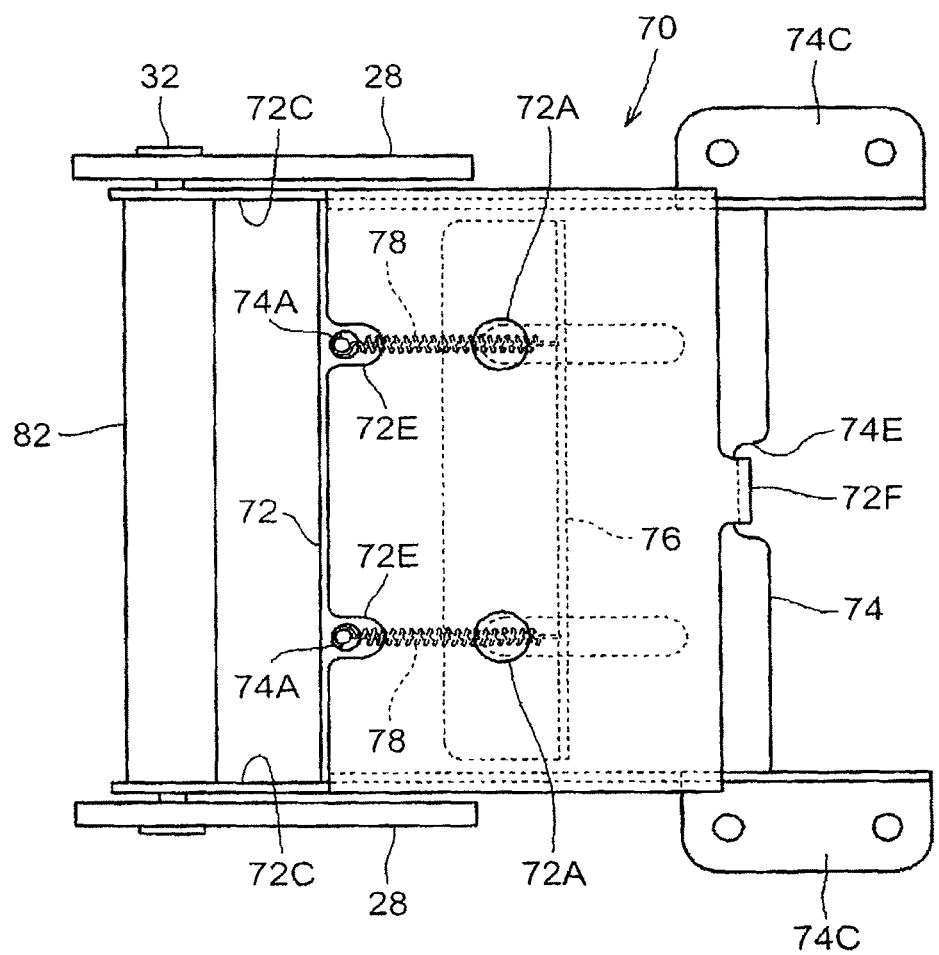
FIG. 7 is a plane view illustrating an absorption mechanism as an association prohibition mechanism for disabling an association function of the association mechanism according to the first embodiment.
Figure 8:
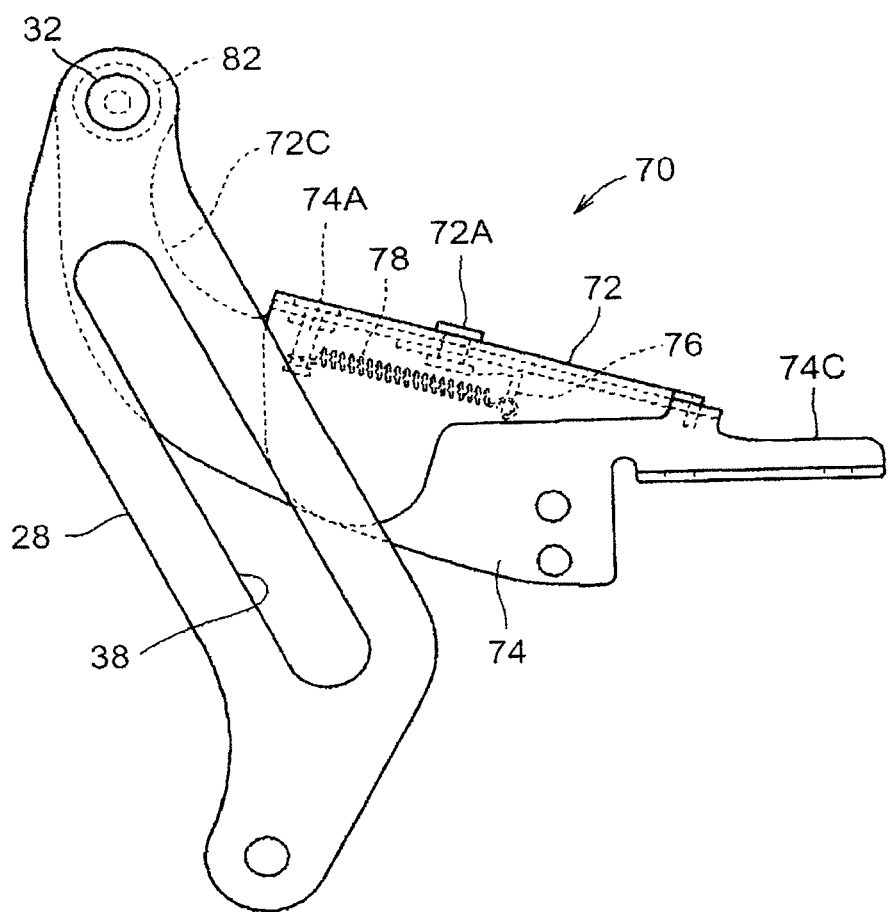
FIG. 8 is a side view of the same absorption mechanism as in FIG. 7.
Figure 9:
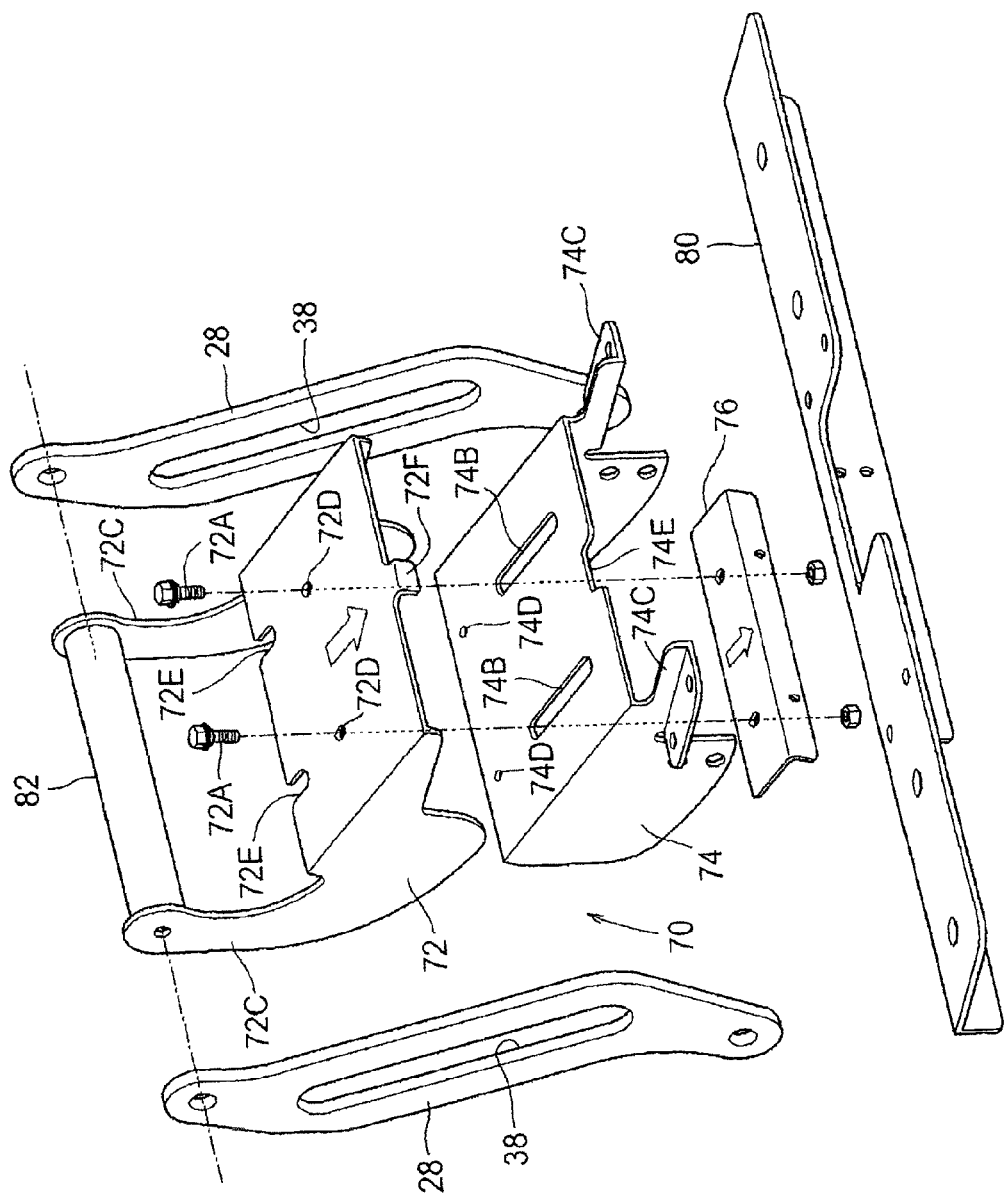
FIG. 9 is an exploded perspective view of the same absorption mechanism as in FIG. 7.

In front of the respective guide slots 74B of the slide base 74, respective through holes 74D are formed, and respective bolts 74A penetrate through the respective through holes 74D so as to be fixed thereto, as illustrated in FIGS. 7, 8. Cutout portions 72E are formed in those parts of the body portion of the slide member 72 which correspond to the respective bolts 74A, so as to prevent the respective bolts 72A from being interfered with the body portion of the slide member 72. One ends of spring members 78, which are an extension spring, are connected to lower ends of the respective bolts 74A, and the other ends of the spring members 78 are connected to a downward-bending portion of the connecting member 76. Note that the spring members 78 and the bolts 74A are not illustrated in FIG. 9. In such a configuration, the slide member 72 is continuously biased forward by the spring members 78 relative to the slide base 74. A stopper 72F is provided downward in a rear end portion of the body portion of the slide member 72, and the stopper 72F determines a position of the slide member 72 by engaging with a cutout portion 74E formed in a rear end portion of the body portion of the slide base 74 so as to correspond to the stopper 72F. Accordingly, the slide member 72 is regularly placed at a position where the stopper 72F engages with the cutout portion 74E, and when an external force to overcome a biasing force by the spring members 78 is applied backward to the slide member 72, the slide member 72 slides over the slide base 74 so as to be moved backward. Note that, in FIG. 6, a reference sign 84 indicates a connecting member for connecting the right and left slide portions 24Ba to each other.

Figure 10:
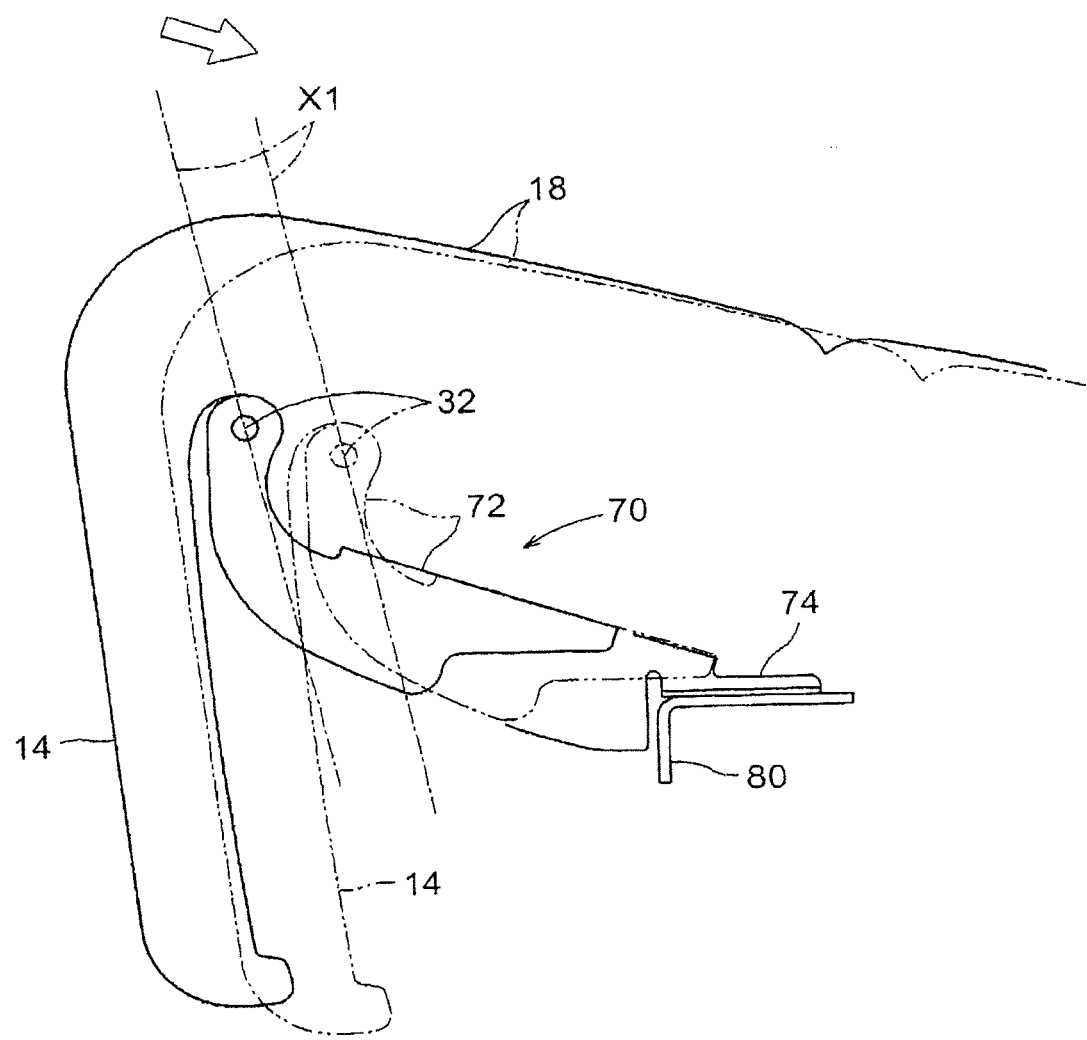
FIG. 10 is an explanatory view to describe an operation of the same absorption mechanism as in FIG. 7.

As such, the pin connection 32 that is a rotating center of the link members A 28 is supported by the base frames 24A via the absorption mechanism 70 constituted by the slide member 72, the slide base 74, etc. On that account, when the seatback 16 is tilted forward from the normal usage position, the slide frames 24B slide backward in association therewith, and the support frame members 14A integrated with the ottoman 14 moves backward, the rear faces of the support frame members 14A are interfered with the link members A 28 around the pin connection 32, so as to press backward that parts of the link members A 28 which are vicinal to the pin connection 32. Accordingly, the slide member 72 overcomes the biasing force by the spring members 78, so as to slide over the slide base 74 together with the connecting member 76, thereby resulting in that the slide member 72 is moved backward as illustrated in a void arrow in FIG. 9. As a result, the link members A 28 move backward together with the slide member 72, thereby allowing the seatback 16 to perform a forward tilting operation. FIG. 10 illustrates a state where the ottoman 14 moves backward while pressing the slide member 72. In FIG. 10, the link member A 28 is not illustrated, but the axis X1 of the guide slot 38 of the link member A 28 is illustrated. This figure also illustrates that the axis X1 performs a backward shift (movement) from a front side together with the slide member 72, as illustrated in a void arrow. When the forward tilting operation of the seatback 16 is finished and the seatback 16 is put back to the normal usage position, the slide frames 24B also move forward together with the seatback 16 so as to be put back. Along with this, a pressing force by the ottoman 14 to the link members A 28 is eliminated, thereby resulting in that the slide member 72 is put back, by the spring members 78, to the position where the stopper 72F engages with the cutout portion 74E of the slide base 74.

When the seatback 16 is put back to the normal usage position from a state where the seatback 16 is placed at the comfortable posture position, the slide frame 24B, the slide portion 24Ba, and the first link member 26 move from the state as illustrated in FIG. 3 to the state as illustrated in FIG. 2, as described above. At this time, a center-holding force caused when the link member A 28 rotates counterclockwise around the pin connection 32 acts backward on the pin connection 32. This force also acts on the slide member 72. However, since the center-holding force at this time is smaller than the biasing force by the spring members 78, the slide member 72 is prevented from being pressed and moved backward by the center-holding force. That is, the biasing force by the spring members 78 is set so as not to move the slide member 72.

According to the first embodiment, when the seatback 16 is tilted forward from the normal usage position, the absorption mechanism 70 constituted by the slide member 72, the slide base 74, etc., absorbs, in accordance with the tilting operation thereof, a backward movement of the slide frames 24B along with the forward tilting of the seatback 16, thereby prohibiting the ottoman 14 from pivoting further backward from the stored position. On that account, even if a large tilting operation of the seatback 16 is performed in the seat including the seatback-associated ottoman 14, it is possible to avoid such a problem that the ottoman 14 cannot move due to interference of the ottoman 14 with a structure such as a structural member for supporting the seat onto the vehicle floor. This makes it possible to perform the large tilting operation of the seatback 16. Further, as described above, since the ottoman 14 moves backward in parallel from the stored position, a relative angle to the side walls 22 on the side portions of the seat main body 12 does not change, so that the ottoman 14 is not inclined with respect to the side walls 22 at the stored position, thereby making it possible to restrain poor appearance.

Figure 11:
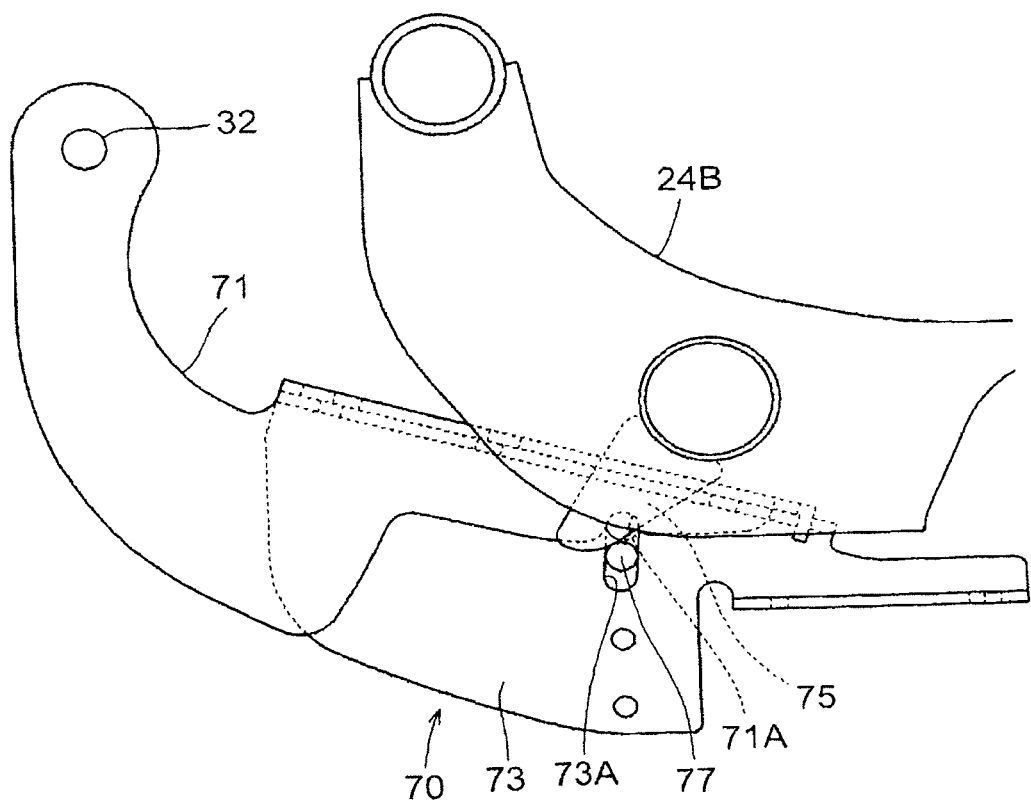
FIG. 11 is a side view illustrating an absorption mechanism as an association prohibition mechanism for disabling an association function of an association mechanism according to a second embodiment.
Figure 12:
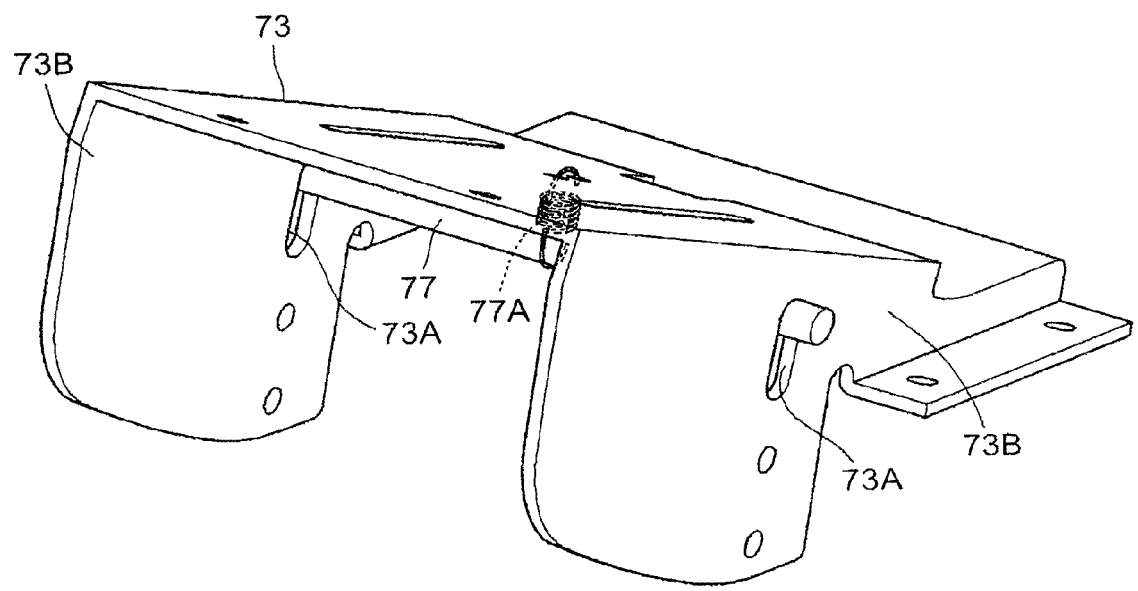
FIG. 12 is an exploded perspective view of the same absorption mechanism as in FIG. 11, and illustrates a slide base portion.

FIGS. 11, 12 illustrate a second embodiment of the invention. A characteristic point of the second embodiment as compared to the first embodiment is the configuration of the absorption mechanism 70. The other points are the same as the first embodiment, so that the same portion has the same reference sign and repetitive descriptions and illustrations are omitted. A slide member 71 and a slide base 73 of an absorption mechanism 70 according to the second embodiment are basically the same as the slide member 72 and the slide base 74 of the absorption mechanism 70 according to the first embodiment, but the slide member 71 and the slide base 73 of the second embodiment are connected to each other so as to be separable if necessary. In view of this, respective slide holes 73A are formed in an elongated shape in the up-and-down direction on right and left side walls 73B of the slide base 73, and a lock bar 77 (an example of a connection body of the invention) is provided so as to penetrate through the slide holes 73A. An intermediate portion of the lock bar 77 in a right and left direction thereof is connected to the slide base 73 via a spring member 77A, and the lock bar 77 is biased upward by the spring member 77A. Accordingly, the lock bar 77 is fixed by abutting with upper end portions of the slide holes 73A in a normal state. In the meantime, respective cutouts 71A to receive the lock bar 77 are formed in backward lower portions on right and left sides of the slide member 71 so as to correspond to the lock bar 77. In a state where the slide member 71 is provided on a top of the slide base 73, those portions of respective ends of the lock bar 77 which project out of the slide holes 73A are fitted within the cutouts 71A of the slide member 71. Those parts on lower surfaces of slide frames 24B which correspond to the respective ends of the lock bar 77 of the slide base 73 are provided with respective unlock plates 75. When a seatback 16 is tilted forward from a normal usage position and the slide frames 24B are moved backward, the unlock plates 75 press the lock bar 77 downward against a biasing force of the spring member 77A like a cam due to outer shapes thereof, so that the lock bar 77 is removed from the cutouts 71A of the slide member 71.

In such a configuration, except a case where the seatback 16 is tilted forward from the normal usage position, the lock bar 77 engages with the cutouts 71A of the slide member 71, so as to integrally connect the slide member 71 to the slide base 73, and a position of a pin connection 32 is fixed to base frames 24A via the slide member 71 and the slide base 73 so as not to change. However, when the seatback 16 is tilted forward from the normal usage position, the unlock plates 75 press the lock bar 77 downward as described above, so that the slide member 71 is slidable over the slide base 73. On that account, as illustrated in FIG. 2, when the seatback 6 is tilted forward in a state where the seatback 6 is placed at the normal usage position and an ottoman 14 is placed at a stored position, a support frame member 14A of the ottoman 14 is going to pivot via a slide portion 24Ba and a first link member 26. However, since the ottoman 14 does not pivot from the stored position to a reverse side to an unfolded position, the pin connection 32 receives a force to be transmitted to the first link member 26 from the slide portion 24Ba, so as to be moved by the absorption mechanism 70 as mentioned earlier. Accordingly, the ottoman 14 and a seat cushion 18 move in parallel together with a pivotal support connection 44 and the pin connection 32. At this time, in the absorption mechanism 70, the slide member 71 is disconnected and separated from the slide base 73, so that the slide member 71 slides backward over the slide base 73. On that account, a moving amount of a rotation outer-circumferential side portion of the ottoman 14 is reduced in comparison with a case where the ottoman 14 pivots, thereby making it possible to avoid such a problem that the ottoman 14 is interfered with a structure such as a structural member for supporting a seat onto a vehicle floor. This accordingly makes it possible to perform a large tilting operation of the seatback 16 in a seat including a seatback-associated ottoman.

As illustrated in FIGS. 7, 8, the absorption mechanism 70 of the first embodiment is configured such that the slide member 72 and the slide base 74 are biased by the spring members 78 so as to be separated from each other, and along with the backward tilting of the seatback 16, the slide member 72 overcomes the biasing force of the spring member 78 and moves relative to the slide base 74, thereby allowing the slide frame 24B to move backward without causing the ottoman 14 to pivot. In contrast, as had been described above based on FIGS. 11, 12, the absorption mechanism 70 of the second embodiment disconnects the connection between the slide member 71 and the slide base 73 at the time of tilting the seatback 16 forward, thereby allowing them to move relative to each other. In view of this, when the seatback 16 is tilted forward, the operation should be performed by overcoming the biasing force of the spring member 78 in the first embodiment, whereas the operation is performable without being affected by the biasing force of the spring in the second embodiment, which yields such an effect that an operation force is reduced.

Figure 13:
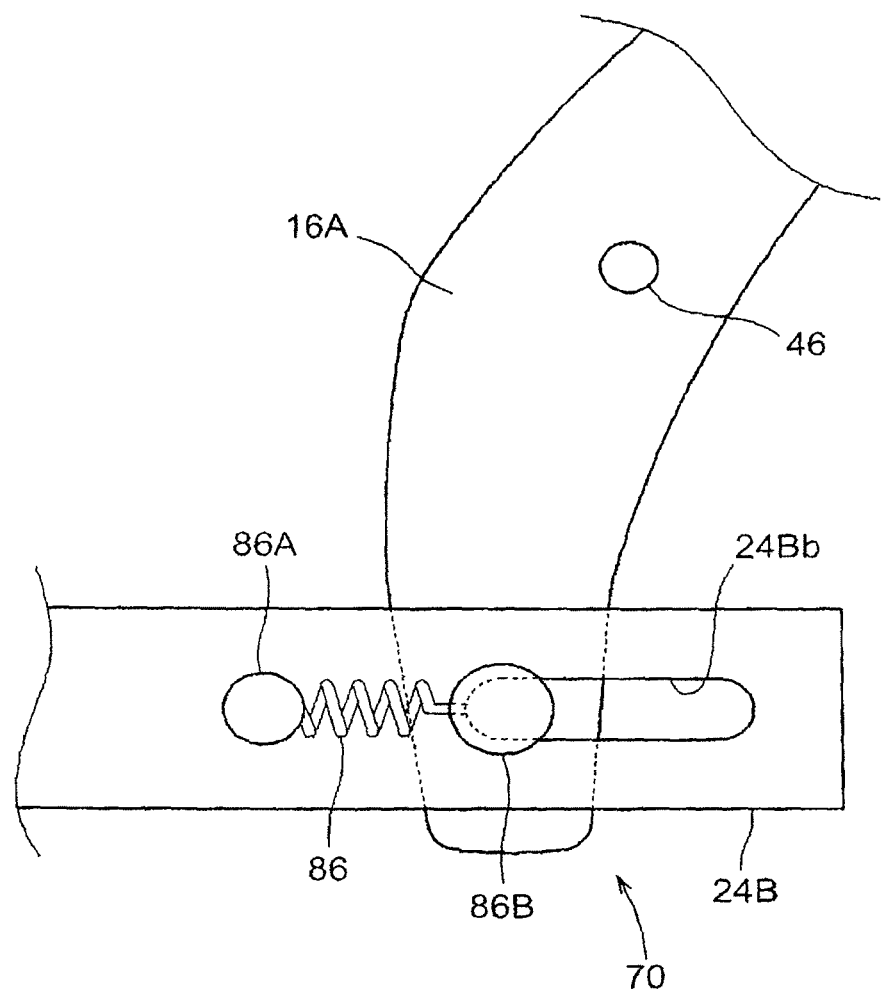
FIG. 13 is a side view illustrating an absorption mechanism as an association prohibition mechanism for disabling an association function of an association mechanism according to a third embodiment.

FIG. 13 illustrates a third embodiment of the invention. A characteristic point of the third embodiment as compared to the first embodiment is the configuration of the absorption mechanism 70. The other points are the same as the first embodiment, so that the same portion has the same reference sign and repetitive descriptions and illustrations are omitted. In the third embodiment, an absorption mechanism 70 is provided in a connection portion between a lower end portion of a side frame 16A of a seatback 16 and a rear end portion of a slide frame 24B, and a slide pin 86B fixed to the lower end portion of the side frame 16A is slidable in a guide slot 24Bb formed in the rear end portion of the slide frame 24B. One end of a spring member 86 is connected to the slide pin 86B, and the other end of the spring member 86 is fixed, by a pin connection 86A, onto the slide frame 24B in front of the guide slot 24Bb.

As such, the absorption mechanism 70 is provided in the connection portion between the lower end portion of the side frame 16A of the seatback 16 and the rear end portion of the slide frame 24B. In view of this, when the seatback 16 is moved from a normal usage position to a comfortable posture position, a front end portion of the guide slot 24Bb is pressed via the slide pin 86B due to a forward movement of the lower end portion of the side frame 16A along with a backward tilting of the seatback 16, so that the slide frame 24B moves forward so as to move an ottoman 14 from a stored position to an unfolded position, as described above. When the seatback 16 set to the comfortable posture position as such is put back to the normal usage position, the lower end portion of the side frame 16A moves backward along with a forward tilting of the seatback 16. At this time, the slide pin 86B moves the slide frame 24B backward via the spring member 86 and the pin connection 86A, so as to move the ottoman 14 from the unfolded position to the stored position. At this time, the spring member 86 is pulled by the slide pin 86B to be extended, but the spring member 86 is set so as not to be extended by a tensile force received at this time. When the seatback 16 placed at the normal usage position is tilted forward, the slide pin 86B moves backward inside the guide slot 24Bb similarly to the above, thereby pulling the spring member 86. At this time, similarly to the cases described in the above embodiments, the ottoman 14 is not able to pivot from the stored position to a reverse side to the unfolded position. Because of this, the slide frame 24B is not able to move backward, so that the spring member 86 is extended and the slide pin 86B slides inside the guide slot 24Bb to move backward. This allows the seatback 16 to be tilted forward from the normal usage position. At this time, a biasing force by the spring member 86 acts to put the seatback 16 back to the normal usage position. In order that the seatback 16 is not put back to the normal usage position by this biasing force, it is preferable that the seatback 16 be locked in a state where the seatback 16 is tilted forward, by a reclining device (not shown) provided in a pivotal support connection 46 in the side frame 16A of the seatback 16, as described above.

According to the third embodiment described above, when the seatback 16 is tilted forward from the normal usage position, the movement of the seatback 16 is absorbed by the absorption mechanism 70 provided in the connection portion between the lower end portion of the side frame 16A and the rear end portion of the slide frame 24B, and the ottoman 14 is not moved from the stored position at this time. Accordingly, the ottoman 14 does not move from the stored position to the reverse side to the unfolded position, unlike a case where such an absorption mechanism 70 is not provided. This makes it possible to prevent poor appearance.

Figure 14:
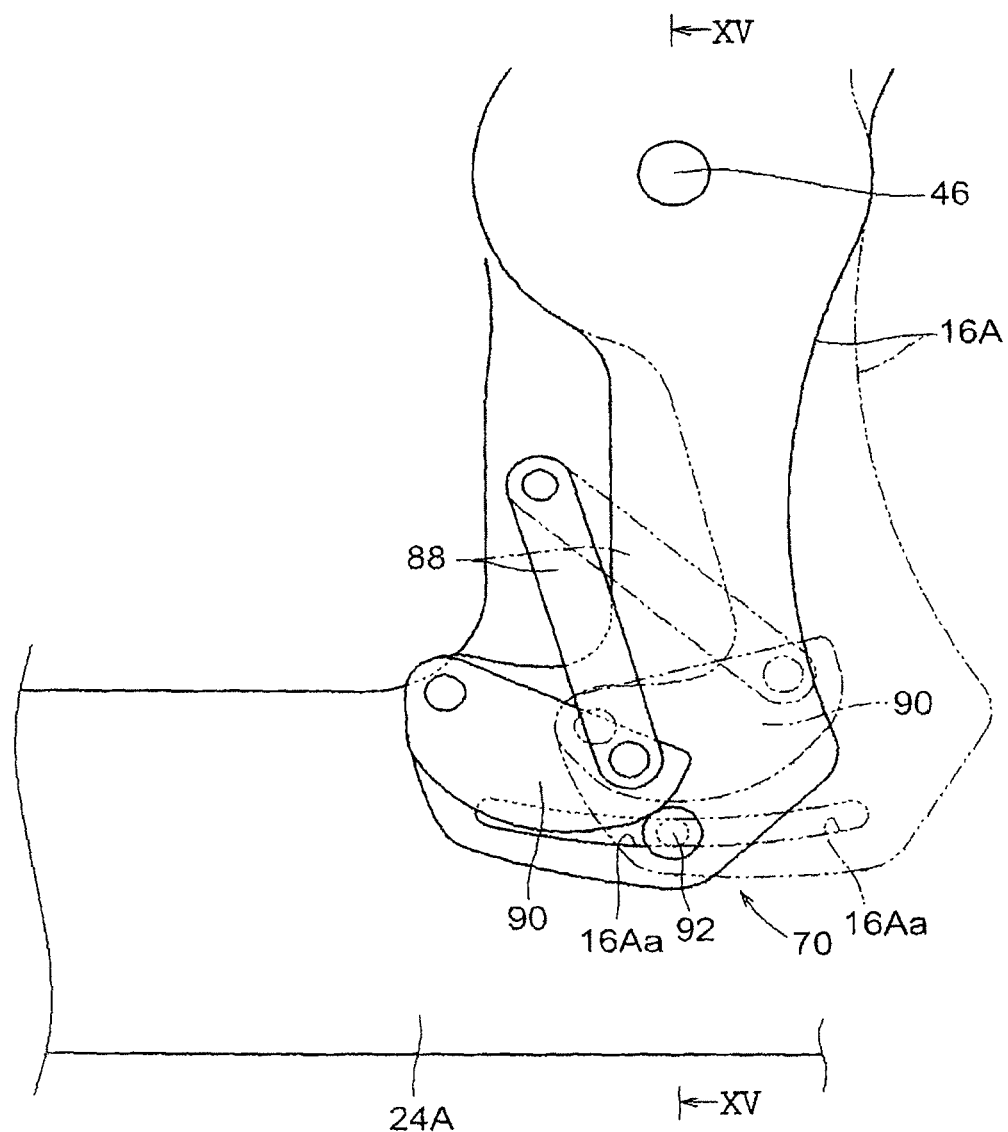
FIG. 14 is a side view illustrating an absorption mechanism as an association prohibition mechanism for disabling an association function of an association mechanism according to a fourth embodiment.
Figure 15:
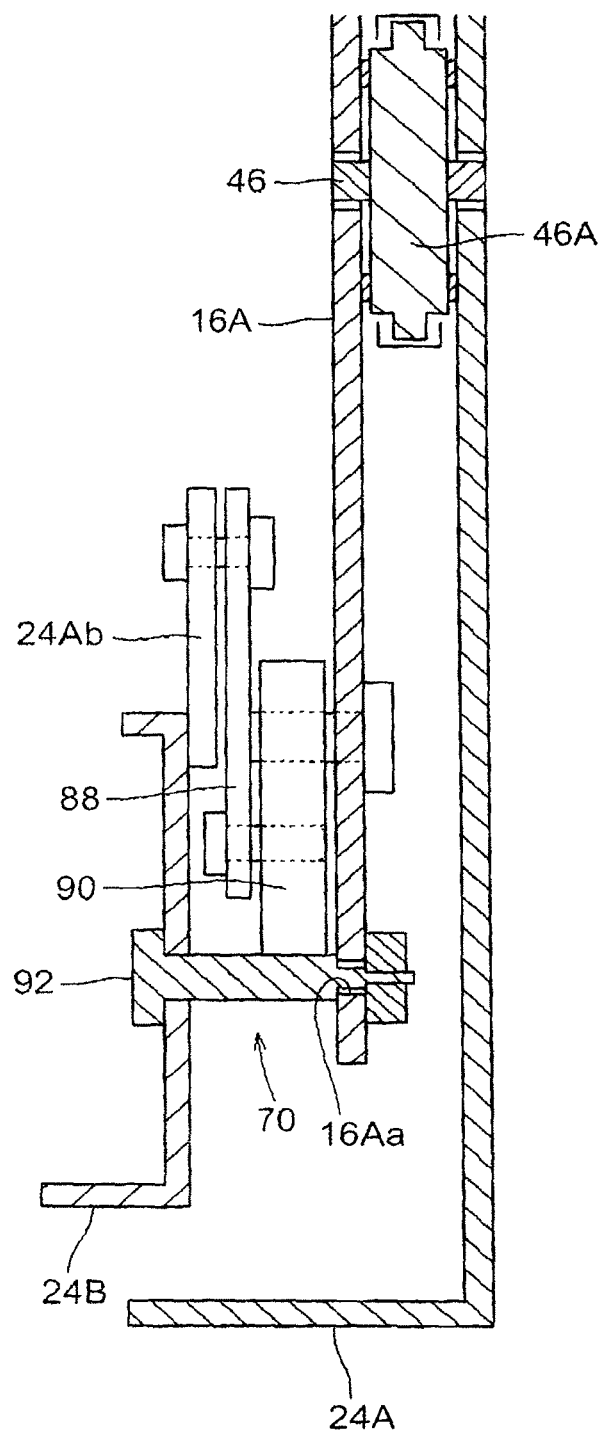
FIG. 15 is a sectional view taken along a line XV-XV of FIG. 14.

FIGS. 14, 15 illustrate a fourth embodiment of the invention. A characteristic point of the fourth embodiment as compared to the first embodiment is the configuration of the absorption mechanism 70. The other points are the same as the first embodiment, so that the same portion has the same reference sign and repetitive descriptions and illustrations are omitted. Similarly to the case of the third embodiment, an absorption mechanism 70 of the fourth embodiment is provided in a connection portion between a side frame 16A and a slide frame 24B. As illustrated in FIGS. 14, 15, a guide slot 16Aa is formed in a lower end portion of the side frame 16A along a circular arc around a rotating center of the side frame 16A, and a connecting pin 92 fixed to the slide frame 24B is fitted in the guide slot 16Aa so as to slide in the guide slot 16Aa. Further, a cam 90 is pivotally fixed onto the side frame 16A between the side frame 16A and the slide frame 24B in a right and left direction, and a rotating center of the cam 90 is set to above a front end of the guide slot 16Aa. The other end of a link 88 of which one end is pivotally fixed to a bracket 24Ab of the slide frame 24B is pivotally connected to that rear end side of the cam 90 which is apart from the rotating center of the cam 90. A fixed position of the one end of the link 88 with respect to the bracket 24Ab is above the cam 90 at the time when the seatback 16 is placed at a normal usage position, and the link 88 is placed between the bracket 24Ab and the cam 90 in the right and left direction. Note that the bracket 24Ab is formed integrally with the slide frame 24B. Further, the side frame 16A is pivotally fixed to the base frame 24A via a well-known reclining mechanism 46A.

Thus, the absorption mechanism 70 is provided in the connection portion between the lower end portion of the side frame 16A of the seatback 16 and a rear end portion of the slide frame 24B. Accordingly, when the seatback 16 is moved from the normal usage position to a comfortable posture position, a rear edge portion of the guide slot 16Aa of the side frame 16A presses the connecting pin 92 forward due to a forward movement of the lower end portion of the side frame 16A along with a backward tilting of the seatback 16, so as to move the slide frame 24B forward via the connecting pin 92, so that an ottoman 14 is moved from a stored position to an unfolded position, as described above. When the seatback 16 set to the comfortable posture position as such is inversely put back to the normal usage position, the lower end portion of the side frame 16A moves backward along with a forward tilting of the seatback 16. At this time, the cam 90 is also moved backward together with the side frame 16A, so that a rear end of the earn 90 presses the connecting pin 92 backward to move the slide frame 24B backward, thereby moving the ottoman 14 from the unfolded position to the stored position. At this time, an angle of the cam 90 with respect to the side frame 16A is determined by the link 88, and even if the cam 90 abuts with the connecting pin 92, the angle does not change. When the seatback 16 placed at the normal usage position is tilted forward, the lower end portion of the side frame 16A moves further backward, similarly to the above. At this time, the angle of the cam 90 with respect to the side frame 16A is an angle at which the cam 90 is not able to press the connecting pin 92 backward, as illustrated in a two-dot chain line in 14. That is, the cam 90 is apart from the guide slot 16Aa and the connecting pin 92. This is because the cam 90 moves backward together with the side frame 16A, and therefore, a rear end portion of the cam 90 is raised by the link 88. As a result, even if the side frame 16A moves backward, the connecting pin 92 moves inside the guide slot 16Aa without moving the slide frame 24B, which allows the seatback 16 to be tilted forward from the normal usage position.

According to the fourth embodiment described above, when the seatback 16 is tilted forward from the normal usage position, the movement of the seatback 16 is absorbed by the absorption mechanism 70 provided in the connection portion between the lower end portion of the side frame 16A and the rear end portion of the slide frame 24B, and the ottoman 14 is not moved from the stored position at this time. Accordingly, the ottoman 14 does not move from the stored position to a reverse side to the unfolded position, unlike a case where such an absorption mechanism 70 is not provided. This makes it possible to prevent poor appearance. The absorption mechanism 70 of the third embodiment is configured such that the side frame 16A is connected to the slide frame 24B via the spring member 86, and along with a forward tilting of the seatback 16, the side frame 16A overcomes the biasing force of the spring member 86, so as to move relative to the slide frame 24B. This makes it possible to tilt the seatback 16 forward from the normal usage position without pivoting the ottoman 14. In contrast, in the absorption mechanism 70 of the fourth embodiment, when the seatback 16 is tilted forward, the side frame 16A is disconnected from the slide frame 24B, so that they move relative to each other. Accordingly, when the seatback 16 is tilted forward, the operation should be performed by overcoming the biasing force of the spring member 86 in the third embodiment, whereas the operation is performable without being affected by the biasing force of the spring in the fourth embodiment, which yields such an effect that an operation force is reduced.

In the above embodiments, the side frame 16A, the slide frame 24B, the slide portion 24Ba, and the first link member 26 are examples of an association mechanism and a link mechanism in an aspect of the invention, and the absorption mechanism 70 is an example of an association prohibition mechanism.

The invention is not limited to the appearances and the configurations described in the above embodiments, and various modifications, additions, and deletes are performable as far as they do not change a gist of the invention. For example, 1) the association mechanism and the association prohibition mechanism may include an electric motor so that they are electrically operated. 2) In the above embodiments, the seat cushion moves in association with a movement of the seatback. However, the seat cushion may be configured such that the seat cushion is fixed to the base member or the vehicle floor so as not to move in association with the movement of the seatback. Note that, in that case, another mechanism for transmitting the movement of the seatback to the ottoman is necessary.

What is claimed is:

1. A vehicle seat in which an angle of a seatback with respect to a seat cushion is adjustable and which includes an ottoman in front of the seat cushion, the vehicle seat comprising:
    an association mechanism which operates the seatback and the ottoman in association with each other, wherein when the seatback is placed at a normal usage position suitable for sitting, the association mechanism causes the ottoman to be stored in a stored position in a front lower portion of the seat cushion, and when the seatback is tilted backward from the normal usage position to a recline position, a backward tilting operation of the seatback causes the association mechanism to rotate the ottoman from the stored position to an unfolded position in front of the seat cushion so as to support legs of an occupant from a lower side; and
    an association prohibition mechanism, wherein when a tilting operation to tilt the seatback forward from the recline position to the normal usage position is performed so as to decrease a relative angle of the seatback with respect to the seat cushion, the association prohibition mechanism modifies an operation of the association mechanism such that while the seatback is tilted forward according to the tilting operation the ottoman is disabled from being rotated from the unfolded position to the stored position in association with a forward tilting operation of the seatback.

2. The vehicle seat according to claim 1, wherein:
    the association mechanism is a link mechanism which connects the seatback to the ottoman, wherein when the seatback is placed at the normal usage position suitable for sitting, the link mechanism causes the ottoman to be placed at the stored position in the front lower portion of the seat cushion, and when the seatback is tilted backward from the normal usage position so as to increase the relative angle of the seatback with respect to the seat cushion, the link mechanism moves the ottoman from the stored position to the unfolded position in front of the seat cushion so as to support the legs of the occupant from the lower side; and
    the association prohibition mechanism is an absorption mechanism, wherein when the seatback is tilted forward from the normal usage position so as to decrease the relative angle of the seatback with respect to the seat cushion, the association prohibition mechanism absorbs a movement of the seatback in a force transmission path including the link mechanism from the seatback to the ottoman so as not to transmit the movement of the seatback.

3. A vehicle seat in which an angle of a seatback with respect to a seat cushion is adjustable and which includes an ottoman in front of the seat cushion, the vehicle seat comprising:
    an association mechanism which operates the seatback and the ottoman in association with each other, wherein when the seatback is placed at a normal usage position suitable for sitting, the association mechanism causes the ottoman to be stored in a stored position in a front lower portion of the seat cushion, and when the seatback is tilted backward from the normal usage position to a recline position, a backward tilting operation of the seatback causes the association mechanism to rotate the ottoman from the stored position to an unfolded position in front of the seat cushion so as to support legs of an occupant from a lower side; and
    an association prohibition mechanism, wherein when a tilting operation to tilt the seatback forward from the recline position to the normal usage position is performed so as to decrease a relative angle of the seatback with respect to the seat cushion, the association prohibition mechanism disables an association function of the ottoman caused by the association mechanism according to a forward tilting operation,
    wherein:
    the association mechanism is a link mechanism which connects the seatback to the ottoman, wherein when the seatback is placed at the normal usage position suitable for sitting, the link mechanism causes the ottoman to be placed at the stored position in the front lower portion of the seat cushion, and when the seatback is tilted backward from the normal usage position so as to increase the relative angle of the seatback with respect to the seat cushion, the link mechanism rotates the ottoman from the stored position to the unfolded position in front of the seat cushion so as to support the legs of the occupant from the lower side;
    the association prohibition mechanism is an absorption mechanism, wherein when the seatback is tilted forward from the recline position to the normal usage position so as to decrease the relative angle of the seatback with respect to the seat cushion, the association prohibition mechanism absorbs a movement of the seatback in a force transmission path including the link mechanism from the seatback to the ottoman so as not to transmit the movement of the seatback;
    the seat cushion and the seatback are fixed to a vehicle floor via a base member;
    the seatback is connected to the base member in an angle adjustable manner;
    the seat cushion is connected to a forward-backward moving member to be moved forward and backward in association with an angle adjustment of the seatback and is slidably fixed to the base member;

the ottoman is pivotally movable between the stored position and the unfolded position by a first rotating shaft provided in a front end portion of the seat cushion, while the ottoman is prevented from pivoting to a reverse side to the unfolded position when the ottoman is placed at the stored position;

the link mechanism includes a first link member connected between a radially outer portion of the first rotating shaft of the ottoman and a second rotating shaft on the base member so as to drive the ottoman, and a second link member extending from the seat cushion toward the first link member and provided so as to be integrated with the seat cushion and slidably connected to the first link member, wherein when the angle adjustment of the seatback is performed and the seat cushion slides over the base member, the second link member drives the first link member;

the second rotating shaft is provided on a slide member supported so as to be slidable forward and backward over the base member; and the absorption mechanism includes a connection body which regularly connects the slide member and the base member so as to prevent the slide member from sliding forward and backward over the base member, and a connection releasing member which disconnects the connection via the connection body between the slide member and the base member, when receiving a movement of the seatback to be tilted forward from the normal usage position.

4. A vehicle seat in which an angle of a seatback with respect to a seat cushion is adjustable and which includes an ottoman in front of the seat cushion, the vehicle seat comprising:

an association mechanism which operates the seatback and the ottoman in association with each other, wherein when the seatback is placed at a normal usage position suitable for sitting, the association mechanism causes the ottoman to be stored in a stored position in a front lower portion of the seat cushion, and when the seatback is tilted backward from the normal usage position to a recline position, a backward tilting operation of the seatback causes the association mechanism to rotate the ottoman from the stored position to an unfolded position in front of the seat cushion so as to support legs of an occupant from a lower side; and an association prohibition mechanism, wherein when a tilting operation to tilt the seatback forward from the recline position to the normal usage position is performed so as to decrease a relative angle of the seatback with respect to the seat cushion, the association prohibition mechanism disables an association function of the ottoman caused by the association mechanism according to a forward tilting operation, wherein:

the association mechanism is a link mechanism which connects the seatback to the ottoman, wherein when the seatback is placed at the normal usage position suitable for sitting, the link mechanism causes the ottoman to be placed at the stored position in the front lower portion of the seat cushion, and when the seatback is tilted backward from the normal usage position so as to increase the relative angle of the seatback with respect to the seat cushion, the link mechanism moves the ottoman from the stored position to the unfolded position in front of the seat cushion so as to support the legs of the occupant from the lower side;

the association prohibition mechanism is an absorption mechanism, wherein when the seatback is tilted forward from the recline position to the normal usage position so as to decrease the relative angle of the seatback with respect to the seat cushion, the association prohibition mechanism absorbs a movement of the seatback in a force transmission path including the link mechanism from the seatback to the ottoman so as not to transmit the movement of the seatback;

the seat cushion and the seatback are fixed to a vehicle floor via a base member;

the seatback is connected to the base member in an angle adjustable manner;

the seat cushion is connected to a forward-backward moving member to be moved forward and backward in association with an angle adjustment of the seatback and is slidably fixed to the base member;

the ottoman is pivotally movable between the stored position and the unfolded position by a first rotating shaft provided in a front end portion of the seat cushion, while the ottoman is prevented from pivoting to a reverse side to the unfolded position when the ottoman is placed at the stored position;

the link mechanism includes a first link member connected between a radially outer portion of the first rotating shaft of the ottoman and a second rotating shaft on the base member so as to drive the ottoman, and a second link member extending from the seat cushion toward the first link member and provided so as to be integrated with the seat cushion and slidably connected to the first link member, wherein when the angle adjustment of the seatback is performed and the seat cushion slides over the base member, the second link member drives the first link member; and the absorption mechanism is configured such that the absorption mechanism does not move the second rotating shaft by a force that the second rotating shaft receives when the ottoman is pivoted by the second link member via the first link member from the unfolded position to a stored-position side, and the absorption mechanism allows the second rotating shaft to move in a moving direction of the second link member when the second rotating shaft receives a force larger than the above force.

5. The vehicle seat according to claim 1, wherein:
when the seatback is tilted backward from the normal usage position, the association mechanism further moves the ottoman in a lateral direction along with the seat cushion.

6. The vehicle seat according to claim 3, wherein:
when the seatback is tilted backward from the normal usage position, the association mechanism further moves the ottoman in a lateral direction along with the seat cushion.

7. The vehicle seat according to claim 4, wherein:
when the seatback is tilted backward from the normal usage position, the association mechanism further moves the ottoman in a lateral direction along with the seat cushion.

* * * * *